United States Patent [19]

Inoue et al.

[11] Patent Number: 5,504,759
[45] Date of Patent: Apr. 2, 1996

[54] DIGITAL SIGNAL RECORDING AND/OR REPRODUCING APPARATUS USING A COMMON PROCESSING DEVICE FOR DIGITAL SIGNALS HAVING DIFFERENT DATA CONFIGURATIONS

[75] Inventors: Hajime Inoue, Chiba; Hiroshi Okada; Masaki Oguro, both of Tokyo, all of Japan

[73] Assignee: Sony Corporation, Tokyo, Japan

[21] Appl. No.: 908,163

[22] Filed: Jul. 2, 1992

[30] Foreign Application Priority Data

Jul. 11, 1991 [JP] Japan .................................. 3-171390
Jul. 12, 1991 [JP] Japan .................................. 3-172739

[51] Int. Cl.⁶ ............................ G11B 20/18; G11B 20/12
[52] U.S. Cl. ......................... 371/37.4; 360/19.1; 360/48
[58] Field of Search ................................. 371/2.1, 37.1, 371/37.4, 37.5, 39.1, 40.1; 360/19.1, 48, 53

[56] References Cited

U.S. PATENT DOCUMENTS

| | | | |
|---|---|---|---|
| 4,688,225 | 8/1987 | Fukami et al. .......................... | 371/37.1 |
| 4,852,102 | 7/1989 | Yamaguchi ............................. | 371/2.1 |
| 4,964,128 | 10/1990 | Sako et al. ............................ | 371/39.1 |
| 4,972,417 | 11/1990 | Sako et al. ............................ | 371/37.4 |
| 4,975,915 | 12/1990 | Sako et al. ............................ | 371/37.4 |

FOREIGN PATENT DOCUMENTS 0303450 2/1989 European Pat. Off. .
0348132 12/1989 European Pat. Off. .

OTHER PUBLICATIONS

Patent Abstracts of Japan vol. 15, No. 062 (E–1033) 14 Feb. 1991 & JP-A-02 288 511 (Canon Inc.) 28 Nov. 1990.
Patent Abstracts Of Japan vol. 15, No. 11 (p–1150) 10 Jan. 1991 & JP-A- 02 254 682 (Canon Inc) 15 Oct. 1990.

*Primary Examiner*—Stephen M. Baker
*Attorney, Agent, or Firm*—William S. Frommer; Alvin Sinderbrand

[57] ABSTRACT

Apparatus for processing first and second digital signals with the same processing device, the two digital signals having respective first and second data configurations which differ from each other, and wherein the first data configuration contains a greater amount of data than the second data configuration. Known, predetermined data is added to the second digital signal, thereby converting the second data configuration to the first data configuration. An error processor, such as an error detection/correction generator or an error corrector, is adapted to process the first digital signal as is and is selectively changed over to receive the converted second digital signal, so as to carry out the same error processing operation on either one of the digital signals.

66 Claims, 11 Drawing Sheets

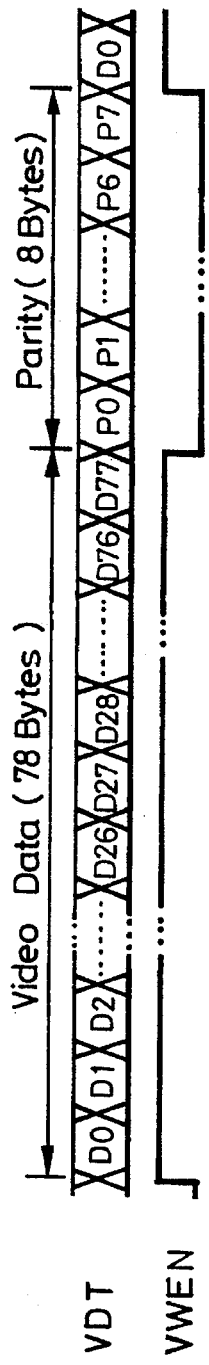
FIG. 6A (Video Data)
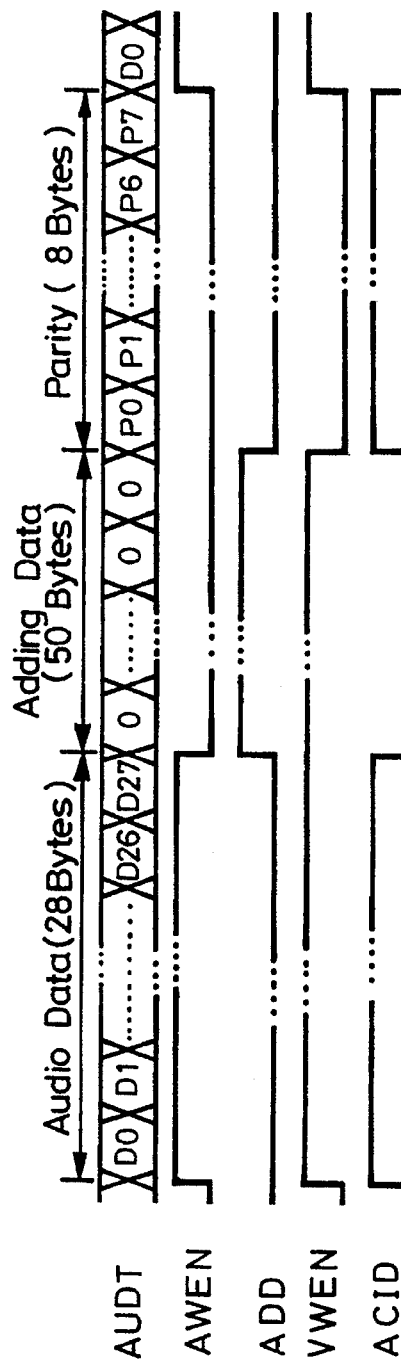
FIG. 6B (Audio Data When Generated)
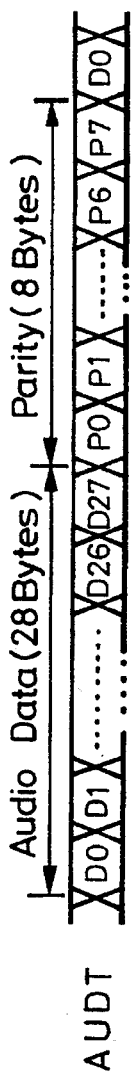
FIG. 6C (Audio Data When Recorded)

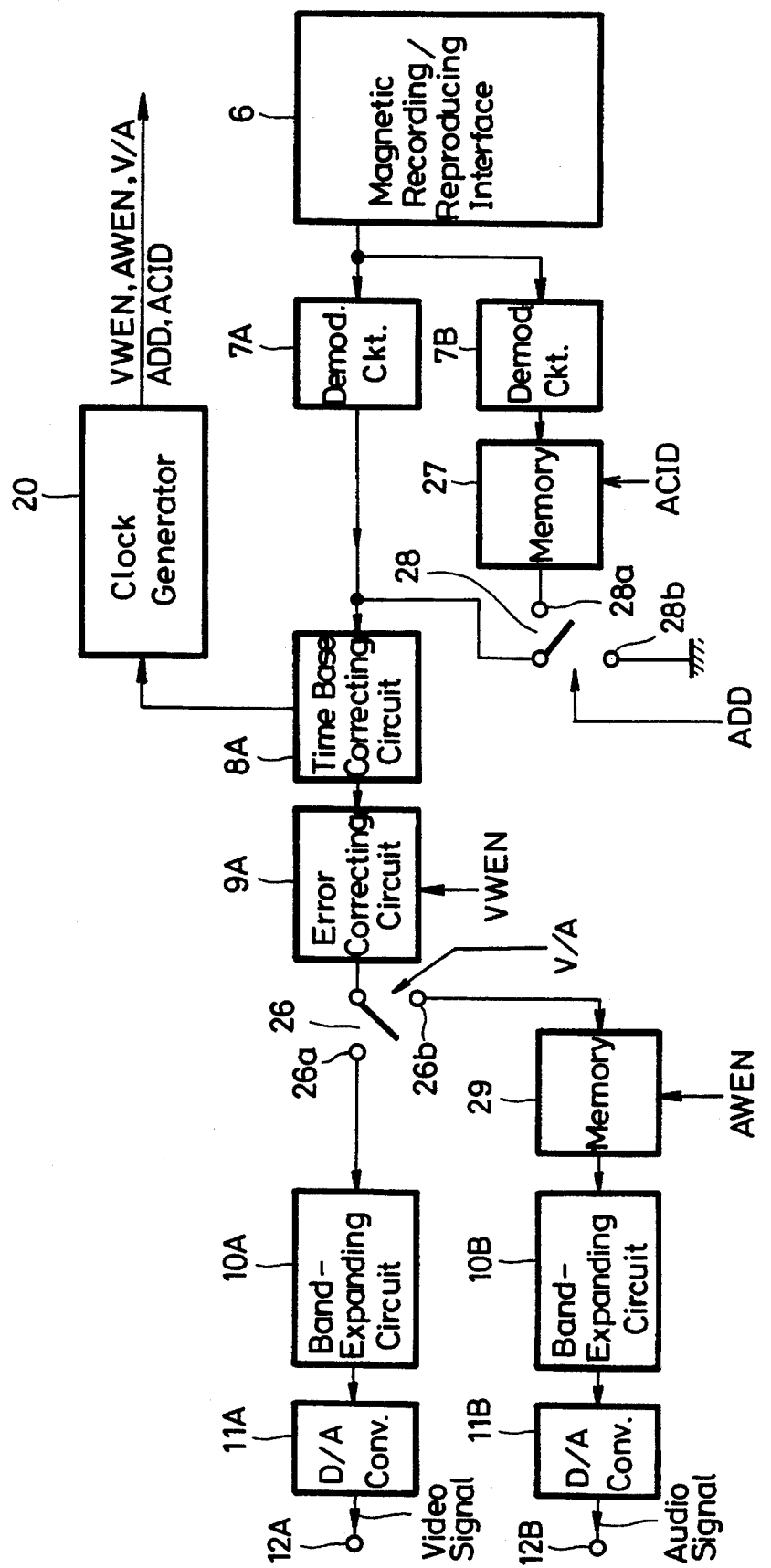

x: Position of Already-Known Data "0"

DIGITAL SIGNAL RECORDING AND/OR REPRODUCING APPARATUS USING A COMMON PROCESSING DEVICE FOR DIGITAL SIGNALS HAVING DIFFERENT DATA CONFIGURATIONS

BACKGROUND OF THE INVENTION

This invention relates to the recording and/or reproducing of digital signals and, more particularly, to the modification of digital signals which exhibit different data configurations such that the same data configuration is used by all of the digital signals, thereby permitting a common signal processor to process different digital signals.

Most, if not all, digital signal recorders include an error correction function. The effectiveness of error correction is particularly useful to digital video recorders, such as digital video tape recorders (DVTRs), wherein many errors that may be due to dropout, recording circuit errors, reproducing circuit malfunctions, or the like, nevertheless can be corrected to provide high quality video pictures. Various types of error correction are known, and error correcting codes have been developed to maximize digital error correcting features. A relatively simple but effective type of error correction is the parity check technique in which parity bits are added to information bits during recording; and these parity bits are used during reproduction to detect and correct errors. Other types of error detection/correction techniques are known, including the use of an error check code, a redundancy code, and the like.

FIG. 1 of the accompanying drawings is a block diagram of recording apparatus typically used in a DVTR. As shown, two different processing channels are provided, one for video (identified with the suffix "A") and one for audio (identified with the suffix "B"). The video channel includes an analog-to-digital (A/D) converter 2A which digitizes at a predetermined sampling rate an analog video signal supplied to input terminal 1A and represents each video signal sample by a multi-bit character, such as an 8-bit byte. The digitized video signal is subjected to band compression by a compressor 3A coupled to A/D converter 2A; and the resultant band-compressed video signal then is coupled to a parity circuit 4A which generates and adds parity bits to the band-compressed video signal.

As an example, compressor 3A may produce blocks of band-compressed, digitized video data, and each block may comprise 78 data bytes. Parity circuit 4A generates eight bytes of parity bits in response to the 78 byte block of digitized video data, and these eight parity bytes are added, or appended, to the 78 bytes of video data, resulting in an 86-byte block.

Preferably, and as is known to those of ordinary skill in the DVTR art, the band-compressed video data is arranged in a so-called "product code" data configuration. This product code configuration of the digitized video data is illustrated schematically in FIG. 3C and is formed by storing $k_2$ rows of video data blocks, each block being formed of $k_1$ video data bytes. The component-type digital video recorder, known as the D-1 video recorder, arranges digitized video data in product code configuration including inner error coding and outer error coding which are powerful tools for error detection and correction. FIG. 3C of the present drawings illustrates one example of such a product code, wherein 8 parity bytes which constitute the inner error code are appended to each of the $k_2$ rows of video data bytes (in this example, $k_1=78$), resulting in a row of $n_1$ ($n_1=86$) bytes. If a multiple of rows is stored in a memory, a two-dimensional array results. In this example, $k_2$ rows of video bytes are stored ($k_2=58$), and each of the $k_1$ columns of video bytes has 6 outer code parity bytes appended thereto. Hence, the total number of rows included in the product code is $n_2$ ($n_2=58+6=64$) and the total number of columns is seen to be $n_1$ ($n_1=78+8=86$) bytes. Thus, parity circuit 4A produces a product code configuration formed of a $k_1 \times k_2$ array of video data bytes, plus inner and outer parity code bytes, producing an overall product code array of $n_1 \times n_2$.

If the $n_1 \times n_2$ array of video and parity bytes is written into a memory in one direction, such as on a row-by-row basis and read out from that memory in a different direction, the product code configuration may be shuffled and serialized into the product code block shown in FIG. 3B. In addition to the video and parity bytes, it is seen that the product code block is preceded by a synchronizing signal and an identifying (ID) signal, the latter serving to identify the type of information which is included in the data block to follow. Here, the ID signal is used to identify video data.

FIG. 3A schematically illustrates a number of blocks of video data which are recorded in a video sector of magnetic tape. As shown, the video sector is preceded by a margin area and a preamble area, followed by the successive video data blocks included in the video sector, followed by a postamble area. The preamble and postamble areas identify and define the extent of the video sector and, moreover, include a pulse signal pattern which is particularly useful in providing a representation of the data clock rate to which a phase locked loop (PLL) is locked in the reproducing apparatus.

The successive product code blocks of video data shown in FIGS. 3B and 3C are supplied from parity circuit 4A to a modulator 5A for modulation in accordance with a typical recording code, such as (1,7), MFM, NRZI, and the like. The modulated, digitized video data then is supplied to a magnetic recording/reproducing interface 6 for recording on, for example, magnetic tape.

The DVTR also records digitized audio data in the same track as the video data. As shown in FIG. 3A, a segment is formed of a video sector followed by an audio sector; and a track may comprise one or several such segments. The audio sector is separated from the video sector by margin and preamble areas, and postamble and margin areas follow the audio sector. Although containing different data, the audio sector is similar to the video sector in that it is formed of several sync blocks, each sync block including a synchronizing signal, an identifying (ID) signal, digitized audio data arranged in product code configuration, and parity data included in the product code. Here, the ID signal identifies audio information as the data that is included in this sync block. As was the case with the video information, the preamble and postamble areas which surround the audio sector include a pulse signal pattern of a frequency equal to the clock frequency of the digitized audio data. This pattern permits a phase locked loop included in the reproducing apparatus to lock onto the reproduced clock frequency, thereby synchronizing the reproducing operation.

As schematically illustrated in FIG. 3C, the digitized audio data included in a sync block admits of product code configuration. Here, the product code configuration is a $k'_1 \times k'_2$ array, wherein $k'_1$ is formed of 28 bytes of digitized audio data and $k'_2$ is comprised of 26 bytes of audio data. Inner and outer error coding is performed and, like the inner and outer error coding of video data, 8 parity bytes are added to each row of audio data bytes, and each column of audio data bytes has 6 parity bytes added thereto. Thus, the $k'_1 \times k'_2$ array of audio data bytes is included in the product code formed as an $n'_1 \times n'_2$ array, wherein $n'_1=k'_1+8=36$; and $n'_2=k'_2+6=32$. However, since the product code configuration of the audio data includes the same number of inner parity code bytes and outer parity code bytes as are included in the video data product code configuration, the ratio of parity data to audio data is greater than the ratio of parity data to video data, thus improving the error correcting ability when the audio data is reproduced. This is preferable because human perception of audio errors is far more sensitive than human perception of video errors.

In the audio channel of the DVTR shown in FIG. 1, analog audio signals are supplied to A/D converter 2B by way of an input terminal 1B, and the digitized audio signals are subjected to band compression by compressor 3B. Then, the band-compressed, digitized audio data is coupled to parity circuit 4B which generates the inner and outer parity codes for the product code configuration shown in FIG. 3C. The audio and parity data arranged in product code configuration is supplied in serial form to a modulator 5B. The thus serialized product code audio data is modulated in accordance with a modulation format suitable for recording, such as the aforementioned (1,7), MFM or NRZI codes, and then supplied to magnetic recording/reproducing interface 6 for recording in the segment shown in FIG. 3A.

Although the video and audio channels are similar, it will be appreciated that the specific parity circuits 4A and 4B differ from each other, particularly because of the amount of data that each must process for parity generation. FIG. 2 shows that parity circuit 4A adds 8 parity bytes to a 78-byte row of video data supplied thereto, thus producing an 86-byte row of video data. It will be seen that parity circuit 4B also adds 8 bytes of parity data to a row of audio data supplied thereto, but since a row of audio data is formed of 28 bytes, the audio parity circuit differs from the video parity circuit.

It will be appreciated that other error detecting/correcting codes can be used with the DVTR recording apparatus shown in FIG. 1. For example, error check codes, redundancy codes, as well as other error codes known to those of ordinary skill in the art can be used.

A typical embodiment of DVTR reproducing apparatus that is compatible with the recording apparatus shown in FIG. 1 is illustrated in FIG. 4. Here, magnetic recording/reproducing interface 6 is coupled to a video channel and an audio channel designated by the suffixes "A" and "B", respectively. In the video channel, video data that is reproduced from the video sector of a segment is separated and demodulated by a demodulator 7A that is compatible with modulator 5A. The demodulated digital video data then is coupled to a time base corrector 8A which functions to eliminate jitter and other time base errors that may be present in the reproduced digital signals. After time base correction, the digital video signal is supplied to an error correcting circuit 9A in which errors that may be introduced during the recording and/or reproducing process are corrected. For example, errors that may be caused by dropout, noise or processing errors included in the video reproducing channel are detected and corrected. The inner and outer parity codes which were added to the video product code, as shown in FIG. 3C, are used by error correcting circuit 9A in a manner known to those of ordinary skill in the art to detect and correct errors that may be present in the product code. After such errors are corrected, the digitized video signal is band-expanded in expander 10A to return the digital video data substantially to the form it occupied at the output of A/D converter 2A. Then, the band-expanded digital video data is converted to analog form by digital-to-analog (D/A) converter 11A, and the analog video signals derived from the D/A converter are supplied to output terminal 12A.

The audio channel coupled to magnetic recording/reproducing interface 6 is similar to the video channel and includes a demodulator 7B to demodulate the separated audio data, a time base corrector 8B to eliminate jitter and other time base fluctuations therein and an error correcting circuit 9B. It is seen from FIG. 3C that the audio product code in which the digital audio data is encoded is a smaller array than the video product code. Hence, error correcting circuit 9B differs in some respects from error correcting circuit 9A, and the same error correcting circuit cannot be shared by both channels. The parity codes that were added to the audio data in the recording apparatus are used by error correcting circuit 9B to detect and correct errors that may be present in the reproduced audio data. Of course, if other error detecting/correcting codes are used, such as ECC, redundancy codes, or the like, then the error correcting circuit included in the reproducing apparatus is compatible with such ECC and redundancy codes to detect and correct errors that may be present in the reproduced audio data.

After error correction, the digitized audio data is band-expanded by expander 10B, converted to analog form by D/A converter 11B and supplied to output terminal 12B.

It is recognized from FIG. 3C that in a typical DVTR application, the amount of data included in a video block is far greater than the amount of data included in an audio sync block. Moreover, if product code configurations are used to represent video and audio data (as is typical), the size of the video product code is substantially larger than the size of the audio product code. Since signal processing, and particularly the addition of error detection/correction data, such as parity data, redundancy bits, check characters, or the like, is performed on product code units, it is seen that the signal processing of the video product code differs from the signal processing of the audio product code. In the particular embodiment shown in FIGS. 1 and 4, parity circuits 4A and 4B differ from each other as do error correcting circuits 9A and 9B. Stated otherwise, because of the different data configurations used for video and audio data, a common parity circuit cannot be used to add error detection/correction data to both the video and audio data, and a common error correcting circuit cannot be used to detect and correct errors in the reproduced video and audio data. Thus, different error processing circuits must be used for the video and audio channels, respectively. This adds to the size and expense of the recording and reproducing apparatus.

This undesired drawback of requiring different processing circuits for the video and audio data is compounded if additional data is recorded and reproduced (e.g. certain control data, user-determined data, or the like) in product code configuration that differs from both the video and audio product code configurations.

An analogous problem arises if a DVTR is provided with a digital audio input terminal to receive digitized audio signals directly (i.e. it is not necessary to convert an input analog audio signal to digital form), but the digital audio data is supplied in a format which differs somewhat from that used by the video recorder. For example, for dubbing, editing or special effects, digital audio data may be supplied directly to the DVTR from a compact disk (CD), a digital audio tape recorder (DAT) or the like. The data configurations of the digital audio data received from such devices, and particularly the bit rates thereof, are not necessarily the same as that of the DVTR. Hence, the signal processing circuits included in the digital audio channel of the DVTR may not operate properly on the digital audio data supplied directly from such external devices. Accordingly, if digital audio data may be supplied at different bit rates or with different data configurations, the signal processing circuitry used therewith must be either adaptive, which is very expensive, or individual circuits must be provided, each being designed to operate optimally at a particular bit rate.

To best appreciate the difficulty presented by digital audio data that may be supplied directly, but at different bit rates, consider that the standard audio data bit rate of a DVTR is derived from a sampling frequency of 48 KHz. If each sample consists of 16 bits, then the audio data bit rate of a DVTR is 48 KHz×16 bits. This is the same bit rate used in DAT. However, the audio data bit rate associated with a CD is 44.1 KHz×16 bits. Consequently, although a typical DVTR is compatible with digital audio data supplied directly from a DAT, the digital audio data that may be supplied from a CD must be further processed to be used by the audio channel of the DVTR. Alternatively, the audio channel in the DVTR must exhibit a degree of redundancy by providing additional circuitry that is compatible with the CD bit rate.

OBJECTS OF THE INVENTION

Therefore, it is an object of the present invention to provide relatively simple and inexpensive circuitry to modify the data configuration of one type of digital signal so that it is substantially identical to the data configuration of another type of digital signal, thereby permitting a common processing device to be used with both types of digital signals.

Another object of this invention is to provide inexpensive signal processing apparatus which reduces the cost and size of a typical DVTR.

A further object of this invention is to provide circuitry which permits a common error processing device to be used with both digital video and digital audio data.

An additional object of this invention is to provide apparatus which permits a common processing device to be used with digital signals that have different bit rates.

Yet another object of this invention is to provide apparatus for enlarging the data configuration of a digital signal, resulting in a common data configuration that may be processed by a device normally used to process data arrange according to the larger data configuration.

A still further object of this invention is to provide apparatus which permits a common parity circuit to operate on digital signals that exhibit different data configurations and contain different amounts of data.

Another object of this invention is to provide apparatus which permits a common error detection/correction circuit to operate on digital signals which exhibit different data configurations and contain different amounts of data.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for processing first and second digital signals with the same processing device, wherein the first and second digital signals have respective first and second different data configurations, the first data configuration containing a greater amount of data than the second. An adder adds known, predetermined data to the second digital signal, thereby converting the second data configuration to the first data configuration. An error processor is connected to process the first digital signal and, by way of a switch, is supplied with the converted second digital signal from the adder. Preferably, the first and second digital signals comprise digitized video and audio data, respectively.

In the preferred embodiment, before the known, predetermined data is added to the second data configuration, the first and second data configurations are product configurations respectively formed as a $k_1 \times k_2$ array of columns and rows of bytes; and as a $k'_1 \times k'_2$ array of columns and rows of bytes, and wherein $k_1 > k'_1$ and/or $k_2 > k'_2$. As a feature of this invention, after the known, predetermined data is added to the second product code configuration, $k'_1$ becomes equal to $k_1$ and $k'_2$ becomes equal to $k_2$. As one aspect, the known, predetermined data is formed of 0 data bytes, and the adder adds $k_1-k'_1$ bytes of 0 data to each row and adds $k_2-k'_2$ bytes of 0 data to each column of the second product code configuration.

As another aspect, the known, predetermined data is formed of plural bytes of a preset pattern, and the adder adds $k_1-k'_1$ bytes of the preset pattern to each row and adds $k_2-k'_2$ bytes of the preset pattern to each column of the second product code configuration.

As a still further aspect, the adder interleaves the known, predetermined data into the second product code array. The particular interleave positions are identified by ID data which is appended to the converted second digital signal so that the interleaved data subsequently may be removed, such as when the converted second digital signal is reproduced and processed.

As another feature of this invention, after the converted second digital signal is error-processed, the known predetermined data that had been added is deleted.

In one embodiment, the error processor is an error detection/correction generator for generating error detection/correction data that is added to the digital signal coupled thereto. For example, the error detection/correction data is parity data, although this data may be check data, redundancy data or other known error detection/correction data.

In another embodiment, the error processor comprises an error corrector which is responsive to error detection/correction data that is included in the second digital signal, such as when that digital signal is recorded and subsequently reproduced, to correct errors that may be introduced in that digital signal.

BRIEF DESCRIPTION OF THE DRAWINGS

The following detailed description, given by way of example and not intended to limit the present invention solely to the illustrated embodiments, will best be understood in conjunction with the accompanying drawings in which:

FIGS. 6A–6C are timing diagrams which are useful in understanding the operation of the embodiment shown in FIG. 5;

FIG. 7 is a block diagram of an embodiment of the present invention in the environment of reproducing apparatus in a DVTR;

DETAILED DESCRIPTION OF PREFERRED EMBODIMENTS

Figure 5:
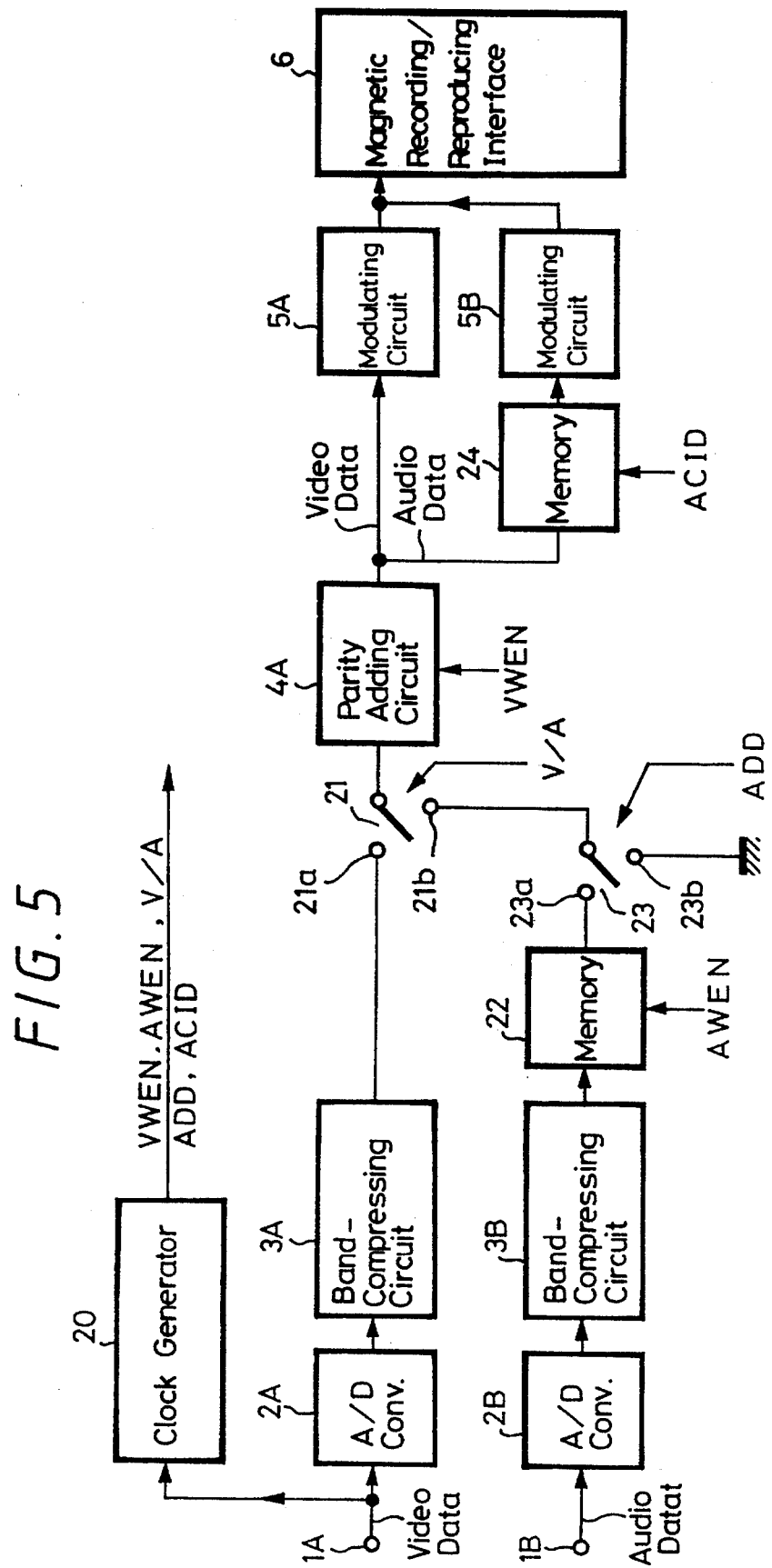
FIG. 5 is a block diagram of one embodiment of the present invention, having particular application to the recording apparatus of a DVTR.

Turning now to the drawings of the present invention, wherein like reference numerals are used throughout, FIG. 5 is a block diagram illustrating one embodiment of the present invention particularly adapted for use in recording apparatus of a DVTR. Following the convention discussed above in conjunction with FIG. 1, circuits included in the video channel are identified with the suffix "A" and circuits included in the audio channel are identified with the suffix "B". As in the case of the representation of FIG. 1, the video channel includes A/D converter 2A, coupled to receive analog video data supplied thereto by way of input terminal 1A, compressor 3A for band-compressing the digitized video signal provided by A/D converter 2A, parity circuit 4A, adapted to add error detection/correction data to the band-compressed digital signals supplied thereto, and modulator 5A for modulating the digital signal received from parity circuit 4A in a format compatible with magnetic recording/reproducing interface 6.

Figure 1:
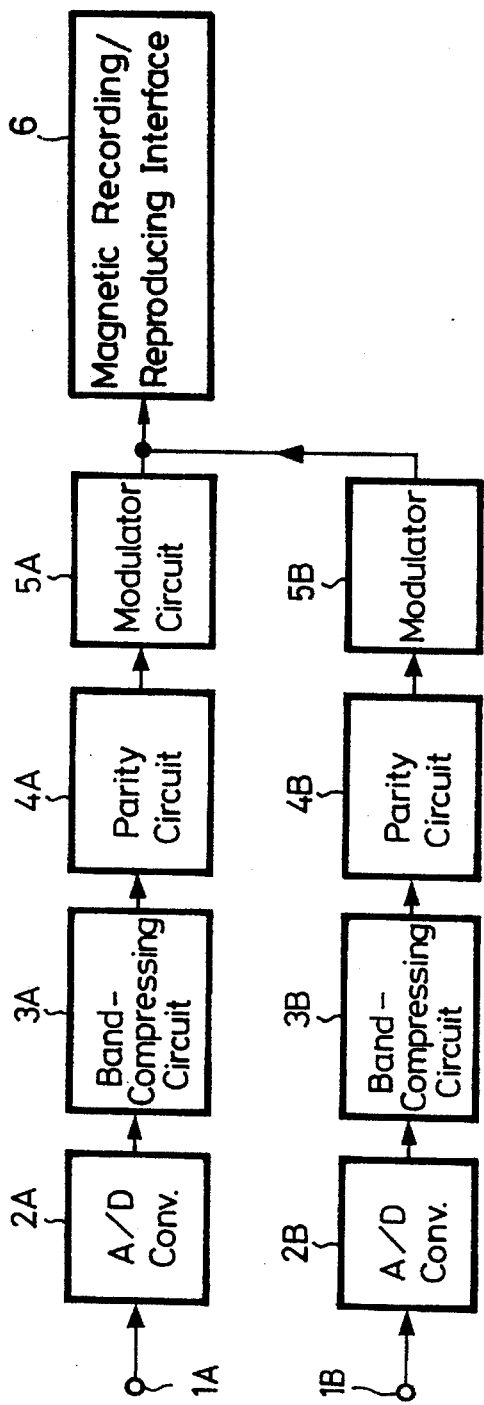
FIG. 1 is a block diagram of video and audio channels included in the recording apparatus of a typical DVTR.
Figure 2:
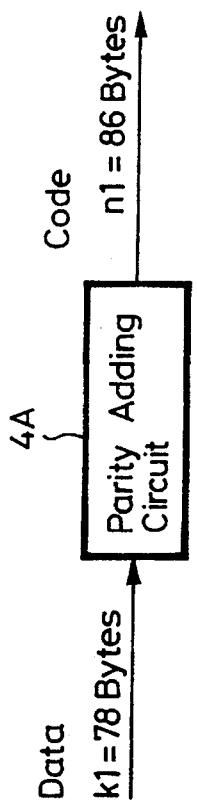
FIG. 2 is a block diagram representing the function of the parity circuit normally included in the video channel of the apparatus shown in FIG. 1.

Likewise, the audio channel is similar to that shown in FIG. 1 and includes A/D converter 2B for digitizing analog audio signals supplied thereto from input terminal 1B, compressor 3B for band-compressing the digitized audio signals and modulator 5B for modulating digital audio data in a format compatible with the magnetic recording/reproducing interface. FIG. 5 differs from FIG. 1 in that parity circuit 4A, which is provided for adding error detection/correction data to digital video signals also is used to add error detection/correction data to digital audio signals. This is achieved by converting the data configuration of the digital audio data such that it is substantially the same as the data configuration of the digital video data. Such data configuration conversion is achieved by a memory 22, an adder 23 and a clock generator 20. The clock generator is coupled to input terminal 1A to generate various timing signals in synchronism with the usual video synchronizing signals, such as horizontal and vertical sync signals as well as the chrominance burst signal. Clock generator 20 is adapted to generate a video enable signal VWEN, an audio enable signal AWEN, a video/audio selector signal V/A, an adder signal ADD and an audio code ID signal ACID. These timing signals are described below in conjunction with FIGS. 6A–6C and are supplied to memory 22, adder 23, parity circuit 4A and additional circuits, to be described.

Memory 22 is coupled to compressor 3B and is adapted to store temporarily a row of audio bytes and then read out that row to parity circuit 4A by way of adder 23 and a video/audio selector switch 21 under the control of audio enable signal AWEN. Adder 23 is schematically illustrated as a change-over switch controlled by the ADD signal and having one input 23a coupled to memory 22 and another input 23b coupled to a reference shown schematically as ground potential. This reference is adapted to supply known, predetermined data to input 23b. For convenience and simplification, in the embodiment described herein, the known, predetermined data is a succession of "0" bits and is referred to as 0 data. More particularly, adder 23 functions to supply bytes of 0 data when the ADD signals couples input 23b to parity circuit 4A.

Video/audio selector 21 is illustrated schematically as a change-over switch having an input 21a coupled to compressor 3A and an input 21b coupled to adder 23. The V/A selector signal determines whether compressor 3A or adder 23 is coupled to parity circuit 4A.

The parity circuit is adapted to add parity bytes to the data supplied thereto. In one embodiment, the parity circuit includes a memory device for storing successive rows of video bytes or audio bytes, as may be supplied thereto by video/audio selector 21, thus storing a two-dimensional array of rows and columns, to add an outer parity code to each stored column and to add an inner parity code to each stored row. As will be described, although the audio product code configuration may contain less data than the video product code configuration, adder 23 adds known, predetermined data to the audio product code configuration so as to make this product code configuration substantially equal to the video product code configuration. Thus, parity circuit 4A is supplied with video and audio product code configurations that are of substantially identical data configuration, and the parity circuit is controlled by video enable signal VWEN to read therefrom a row of data bytes whose length is equal to a row of video data bytes, followed by the inner code parity bytes for that row.

The output of parity circuit 4A is coupled to modulator 5A and also to a memory 24, the latter being controlled by an audio code ID signal ACID which determines that portion of the data from the parity circuit which is stored in the memory to be read therefrom. As will be described, memory 24, under the control of audio code ID signal ACID, functions to delete the known, predetermined data that had been added to the audio data by adder 23. That is, the audio data is returned to its original form, except that the inner and outer parity codes that had been added thereto by parity circuit 4A remain appended to this reconverted audio product code. The output of memory 24 is coupled to modulating circuit 5B which modulates the reconverted audio product code and appended parity data for recording by magnetic recording/reproducing interface 6.

The manner in which video and audio data exhibiting the same data configuration are supplied to parity circuit 4A now will be described. Video data is digitized by A/D converter 2A and band-compressed by compressor 3A. For example, band compression may be by means of an orthogonal transform, such as a discrete cosine transform, or other conventional band-compressing techniques. The band-compressed video data is coupled to parity circuit 4A by video/audio selector 21. Consistent with the product code configuration shown in FIG. 3C, it is assumed that $k_1$ successive bytes of video data are written into parity circuit 4A, and as a numerical example, $k_1=78$. The parity circuit preferably includes a memory device to store $k_2$ rows ($k_2=58$) of video bytes, with each row containing $k_1$ bytes. Accordingly, the memory device stores a $k_1 \times k_2$ array, to which the parity circuit adds an outer code of 6 parity bytes to each of the $k_1$ columns of video bytes, resulting in $n_2$ rows of data ($n_2=k_2+6=58+6=64$). Then, the parity circuit adds an inner code of 8 parity bytes to each of the $n_2$ rows of data as a function of the data content of each row. As a result, each row of data now consists of $n_1$ bytes ($n_1=k_1+8$), or 86 bytes of video and parity data. With the addition of the parity data, the product code appears as an $n_1 \times n_2$ array of columns and rows (which, in the present numerical example, is seen to be an 86×64 array).

Figures 3A, 3B, 3C:
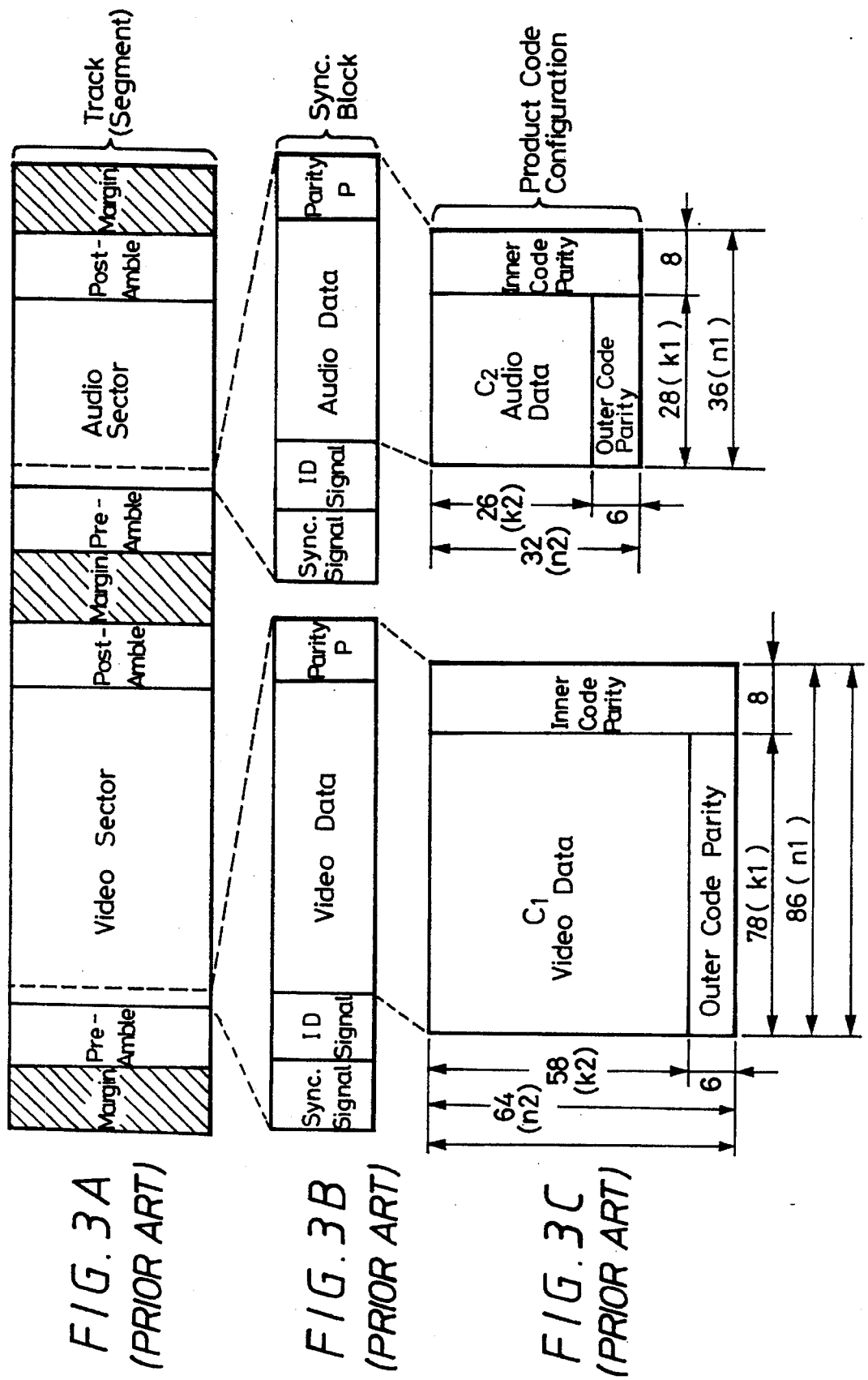
FIGS. 3A–3C schematically represent the video and audio data normally recorded by a DVTR.

FIG. 6A illustrates the successive video bytes VDT supplied to the memory device of parity circuit 4A in each row, which data bytes are read from that memory device in response to the positive portion of the video enable signal VWEN. During the negative portion of the video enable signal, the parity bytes are appended to the read out video bytes. Thus, each row in the product code of FIG. 3C is formed of video bytes $D_0, D_1 \ldots D_{77}$ followed by the inner code parity bytes $P_0, P_1 \ldots P_7$. The product code is supplied from parity circuit 4A to modulator 5A in serial form for modulation and recording by magnetic recording/reproducing interface 6.

Now, let it be assumed that band-compressed audio data is supplied from compressor 3B to memory 22. It will be appreciated that the timing of the supply of this band-compressed audio data is synchronized with the scanning of video tape by the recording heads to facilitate the recording of the audio data in the audio sector shown in FIG. 3A. It is further assumed that the band-compressed audio data is in a form suitable for configuring in the product code configuration shown in FIG. 3C. Accordingly, and as is conventional, memory 22 is adapted to store a row of $k'_1$ audio bytes (wherein $k'_1=28$); and once a row of audio bytes is stored in memory 22, it is read out therefrom in response to the audio enable signal AWEN shown in FIG. 6B. It is seen that the audio enable signal AWEN includes a positive portion during which audio bytes $D_0, D_1 \ldots D_{27}$ are read out. These bytes are supplied to input 23a of adder 23.

The adder is controlled by the ADD signal shown in FIG. 6B. During the negative portion of the ADD signal, input 23a is coupled to parity circuit 4A by way of input 21b of video/audio selector 21. During the positive portion of the ADD signal, the reference coupled to input 23b is supplied to the parity circuit. As shown in FIG. 6B, 0 data bytes are supplied to the parity circuit during this positive portion of the ADD signal.

Figure 13A:
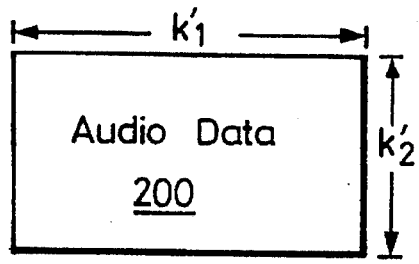
FIGS. 13A–13C schematically represent the data configuration conversion of the present invention.
Figure 13B:
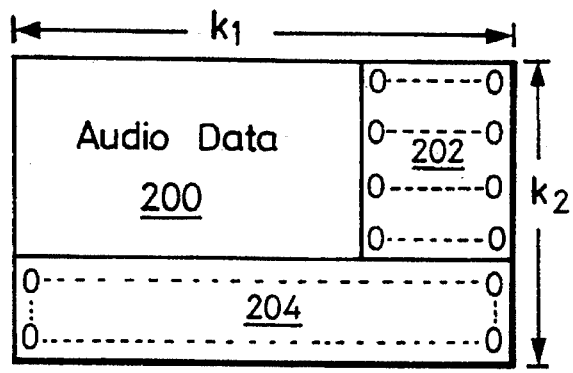
Figure 13C:
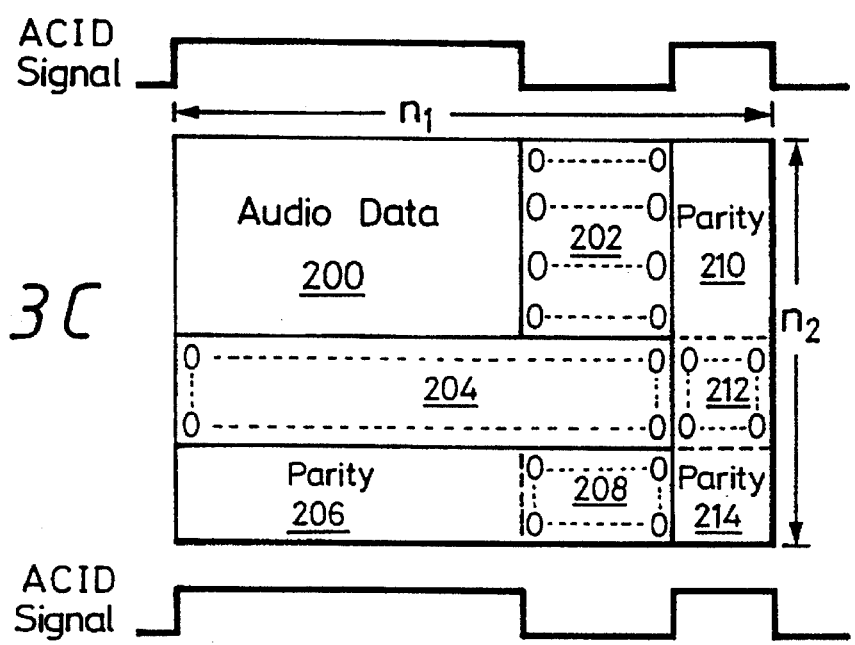

It is appreciated that the objective of the present invention is to increase the size of the audio product code configuration (shown as product code configuration 200 in FIG. 13A) so that it is substantially equal to the video product code configuration. This is attained by supplying a number of 0 data bytes equal to the difference between the number of bytes included in a row of video data ($k_1$ bytes) and the number of bytes included in a row of audio data ($k'_1$ bytes) and also supplying a number of "extra" rows of 0 data bytes equal to the difference between the number of rows in the video product code ($k_2$ rows) and the number of rows in the audio product code ($k'_2$ rows). Since $k_1=78$ and $k'_1=28$, the number of 0 data bytes that are added to each row of audio data is seen to be $k_1-k'_1=50$. Likewise, the number of "extra" rows of 0 data bytes that are added to the audio data is $k_2-k'_2=58-26=32$. The "extra" rows may be added before or after each row is enlarged. It will be appreciated that after a row of data bytes is read from memory 22 to parity circuit 4A, 50 bytes of 0 data are supplied by adder 23 to the parity circuit. Assuming that the parity circuit includes a two-dimensional memory, the product code configuration 200 is converted therein to the video product code configuration by the addition of the 0 data bytes 202 in each audio product code configuration row and by the addition of "extra" rows 204, as seen in FIG. 13B. Since the parity circuit is adapted to generate parity data after $k_1$ bytes of digital data are supplied thereto, it is seen that parity circuit 4A generates the outer code 206 of 6 parity bytes and the inner code 210 of 8 parity bytes to each column and each row of the converted (or enlarged) audio product code configuration, as shown in FIG. 13C. It will be recognized that outer parity code 206 includes a section 208 that is essentially of 0 data and that inner parity code 210 includes a section 212 that is essentially of 0 data and a section 214 that is a function of parity data section 206.

Thus, the audio product code configuration, although initially smaller than the video product code configuration and, thus, containing less data, is converted to a data configuration equal to that of the video product code configuration.

Therefore, it is seen that, by adding known, predetermined data to the audio data 200 supplied from memory 22, the data configuration of this audio data is made equal to that of the video data. Consequently, the same parity circuit 4A may be used to generate and append error detection/correction data for both the video data supplied from compressor 3A and the audio data supplied from compressor 3B, even though the original data configuration of the audio data is substantially smaller than the data configuration of the video data.

After converting the audio product code configuration in the manner discussed above, the converted audio product code is supplied to and stored in memory 24 for the purpose of deleting the known, predetermined data that had been added thereto. Memory 24 is enabled to read out the data stored therein in response to the positive portion of the audio code ID signal ACID shown in FIG. 6B. It is seen from FIG. 13C that the positive portion coincides with the $k'_1$ audio data bytes $D_0, D_1 \ldots D_{27}$ of portion 200, as well as the 8 inner code parity bytes $P_0 \ldots P_7$ of portion 210. The negative portion of the audio code ID signal ACID coincides with the 0 data bytes 202 that had been added to each row of audio data and also to the 0 parity data 208 in the outer parity code Thus, memory 24 reads out the $k'_1$ audio bytes together with the 8 inner code parity bytes in each row, but not the 0 data bytes.

In like fashion, memory 24 is inhibited from reading those rows of 0 data bytes that had been added to the $k'_2$ rows of audio data bytes, namely the 32 rows of 0 data bytes of portion 204 that had been used to enlarge the total number of rows included in the audio product code. Thus, these 32 rows of 0 data bytes are not read from memory 24. Nevertheless, the six rows of outer parity code bytes 206 that had been calculated and appended by parity circuit 4A are read from memory 24. It is seen, therefore, that by deleting the known, predetermined data that had been added to the audio data configuration, in portions 202 and 204, as well as deleting the 0 parity data portion 212, the audio data configuration is returned to the form shown in FIG. 3C. This restored product code configuration, consisting of audio data bytes 200 and outer and inner parity code bytes 206 and 210 (parity portion 210 includes portion 214), is supplied to modulator 5B for modulation and recording by magnetic recording/reproducing interface 6 in the audio sector shown in FIG. 3A.

While the foregoing description has assumed that error detection/correction circuit 4A is a parity circuit, it will be appreciated that other error detection/correction circuits may be used, such as circuits that generate error check codes, redundancy codes, and the like. When a parity circuit is used, the addition of 0 data bytes to the audio data does not disturb the inherent parity of that audio data and, thus, when such 0 data bytes are removed by memory 24, no change in the calculated parity bytes is needed.

Figure 4:
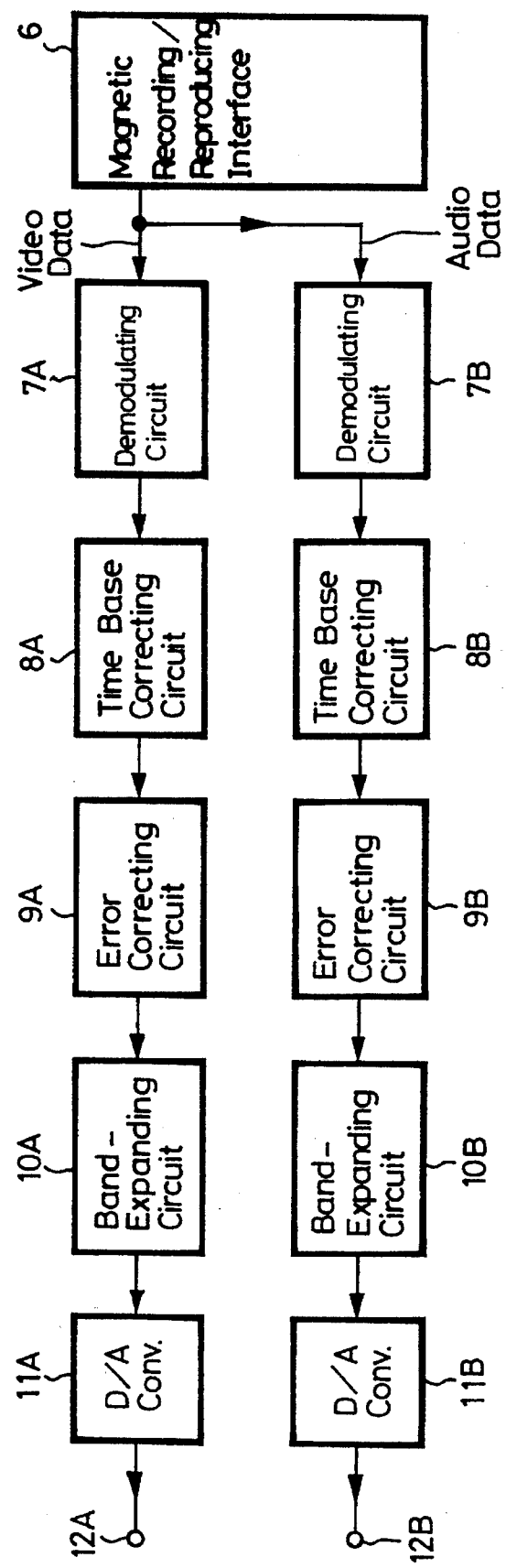
FIG. 4 is a block diagram of video and audio channels included in the reproducing apparatus of the typical DVTR.

Turning now to FIG. 7, there is illustrated one embodiment of reproducing apparatus which employs the principles of the present invention to recover video and audio data in a DVTR. As before, the video channel is identified with the suffix "A" and the audio channel is identified with the suffix "B". Similar to FIG. 4, magnetic recording/reproducing interface 6 is coupled to demodulators 7A and 7B which demodulate the video and audio data, respectively, and demodulator 7A is coupled to time base corrector 8A. The time base corrector is coupled to error corrector 9A, which may be similar to aforedescribed error corrector 9A shown in FIG. 4, and the output of this error corrector is coupled to expander 10A and to D/A converter 11A.

The output of demodulator 7B is coupled to a memory 27 which, in combination with an adder 28 functions to convert the data configuration of the digital audio signal from the form in which it was recorded to a form which is substantially identical to that of the digital video signal. By converting the data configuration of the digital audio signal, the same time base corrector and error corrector that are provided in the video channel can be used to correct time base fluctuations and errors in the reproduced audio signal. That is, the separate time base and error correctors 8B and 9B that have been used in the reproducing apparatus shown in FIG. 4 can be eliminated.

Subsequent to error correction, the digital audio signal is reconverted back to its original form, as will be described, and then band-expanded by expander 10B and converted to an analog signal by D/A converter 11B.

Those elements shown in FIG. 7 which comprise the present invention include clock generator 20, which may be similar to the clock generator of FIG. 5, memory 27, adder 28, video/audio selector 26 and memory 29. Clock generator 20 is coupled to time base corrector 8A and operates to extract from the time base corrected digital video signal various timing signals such as VWEN, AWEN, V/A, ADD and ACID, which have been described hereinabove. Individual ones of these timing signals are coupled to error corrector 9A, video/audio selector 26, memory 27, adder 28 and memory 29, as indicated in FIG. 7.

Memory 27 is coupled to demodulator 7B to receive the demodulated digital audio data recovered from the record medium by magnetic recording/reproducing interface 6. This memory functions in a manner similar to memory 22 of the recording apparatus shown in FIG. 5 and is adapted to store each row of audio data together with the outer and inner parity codes. It will be appreciated that each row of audio data that is recovered from magnetic recording/reproducing interface 6 is of the form shown in FIG. 6C as audio data AUDT, consisting of 28 audio data bytes followed by 8 parity bytes. Memory 27 is coupled to time base corrector 8A by adder 28. This adder is seen to be similar to aforedescribed adder 23 and includes an input 28a coupled to memory 27 and an input 28b coupled to a source of known, predetermined data, such as a reference source schematically illustrated as ground. As before, the known, predetermined data is assumed to be bytes of 0 data. Adder 28 is responsive to the ADD signal shown in FIG. 6B and is adapted to add a number of 0 data bytes to each row of audio and parity data stored in memory 27. As a result, each row of audio and parity data is enlarged by the number of 0 data bytes added thereto by adder 28.

Time base corrector 8A is adapted to correct time base fluctuations in the digital signals supplied thereto. It is seen that when the video sector shown in FIG. 3A is reproduced, the time base corrector eliminates jitter in such digital video signals. When the audio digital signals recorded in the audio sector are reproduced, the time base corrector operates to eliminate jitter therein. The output of time base corrector 8A is coupled to error corrector 9A which, for example, may be a parity error corrector adapted to correct errors that may be present due to, for example, dropout. Error corrector 9A uses the inner and outer parity codes that are recorded with the video data and with the audio data in the configurations shown in FIG. 3C to carry out its error correcting function. The output of the error corrector is coupled to video/audio selector 26 which, depending upon whether video or audio data is reproduced from the record medium, couples the error corrector either to expander 10A or to expander 10B, the latter by way of memory 29. As a feature of the present invention, a common error corrector 9A is used to correct errors that may be present in either the digital video signal reproduced from the record medium or the digital audio signal reproduced therefrom. It will be appreciated that the video/audio signal V/A controls the condition of video/audio selector 26 and may be synchronized with the scanning of the video and audio sectors.

Memory 29 is similar to aforedescribed memory 24 and is adapted to delete the known, predetermined data that had been added to the reproduced digital audio signals to convert the data configuration of the digital audio signals to a configuration substantially equal to that of the digital video signals. The output of memory 29 is coupled to expander 10B whose output is coupled to output terminal 12B by way of D/A converter 11B.

The manner in which the present invention converts the digital audio data to a form substantially identical to that of the digital video data so that the same signal processing circuits, such as time base corrector 8A and error corrector 9A, can be used with both the video data and the audio data that are reproduced from the record medium, now will be described. FIG. 6C is a schematic illustration of the audio data that is recorded and reproduced by magnetic recording/reproducing interface 6. Consistent with the numerical example discussed above, the audio data exhibits the product code configuration shown in FIG. 3C wherein each of the $n'_2$ rows ($n'_2=32$) is formed of $k'_1$ audio data bytes ($k'_1=28$) and 8 inner code parity bytes. The row of digital audio data AUDT shown in FIG. 6C is stored in memory 27. This memory is supplied with the audio code ID signal ACID as a read-out signal. Data stored in memory 27 is read out therefrom during positive portions of the ACID signal, and data is not read from the memory during the negative portions of the ACID signal. It is seen that the positive portions of the ACID signal coincide with the 28 bytes of audio data $D_0 \ldots D_{27}$ (and also with the 28 bytes of outer parity code data) included in a row of the product code configuration, and also with the 8 inner code parity bytes $P_0 \ldots P_7$ appended to each row of audio (and outer parity code) data. Consistent with the waveform of the ACID signal, it is appreciated that the 28 bytes of audio data are read from a memory 27, and then the read-out operation is interrupted for a period of time.

The interruption in the reading of the audio data stored in memory 27 coincides with the ADD signal shown in FIG. 6B and supplied to adder 28. During the negative portions of the ADD signal, memory 27 is coupled to time base corrector 8A and error corrector 9A. However, during positive portions of the ADD signal, adder 28 couples known, predetermined data to the time base corrector and error corrector. As before, and for the purpose of simplification, this known, predetermined data is assumed to be bytes of 0 data. Thus, while the reading out of memory 27 is interrupted, a number of 0 data bytes are added to the row of data bytes that had been read previously. FIG. 6B illustrates that fifty 0 data bytes are supplied to the time base corrector and error corrector. As was the case in the recording apparatus, the number of bytes of known, predetermined data that is added to the audio data bytes is seen to be $k_1-k'_1=50$. Then, after these fifty 0 data bytes are added to a row of audio data bytes, adder 58 couples memory 27 to the time base and error correctors; and audio code ID signal ACID reads out the inner code parity bytes that had been stored in the memory. Hence, each row in the audio product code configuration is enlarged by $(k_1-k'_1)=50$ bytes.

After time base correction, the enlarged rows of audio data are supplied to error corrector 9A, which includes a memory for storing the enlarged rows of audio data produced by adder 28. After $k'_2$ rows of enlarged audio data are read from memory 27 to the error corrector, adder 28 is controlled to add $k_2-k'_2=32$ rows of 0 data bytes. Hence, the total number of rows stored in the error corrector memory is increased from $k'_2=26$ (i.e. the number of audio data rows that had been recorded) to $k_2=58$, shown as portions 204 and 212 in FIG. 13C. Then, the outer parity code recovered from the record medium and stored in memory 27 is supplied to error corrector 9A. As a result of memory 27 and adder 28, the audio product code configuration is converted from the $k'_1 \times k'_2$ array to the $k_1 \times k_2$ array, the latter exhibiting the same product code configuration normally exhibited by the video data, as shown in FIG. 13C.

Error corrector 9A utilizes the inner and outer parity codes in conventional manner to detect and correct errors that may be caused by dropout or other errors in the magnetic recording/reproducing interface. Although error correction based upon parity data has been shown herein, it is appreciated that error correction based upon other types of error detection/correction codes may be used, such as check codes, redundancy codes, and the like. In any event, after error correction, each row of the product code configuration shown in FIG. 13C stored in the error corrector memory is read out therefrom in response to the video enable signal VWEN. When error corrector 9A corrects errors in video data reproduced from the record medium, each row stored in the error corrector memory appears as shown in FIG. 6A; and it is recognized that only the video data bytes $D_0 \ldots D_{77}$, and not the parity bytes $P_0 \ldots P_7$, are read from the error corrector memory in response to the VWEN signal. Video/audio selector 26 couples each row of corrected video data from error corrector 9A to expander 10A which band-expands the video data and couples same to D/A converter 11A.

When the product code stored in the error corrector memory is the converted audio product code, each row appears as represented by audio data AUDT in FIG. 6B. It is recognized that each row includes $k'_1$ bytes of audio data, followed by $k_1-k'_1$ bytes of 0 data, followed by the parity data. Video/audio selector 26 responds to the video/audio select signal V/A, produced when the audio data in a segment on the record medium is reproduced, to couple error corrector 9A to memory 29. As shown in FIG. 6B, video enable signal VWEN reads out from the error corrector memory the audio bytes and the 0 data bytes on a row-by-row basis. Each such expanded row of audio data is stored in memory 29, resulting in the array of FIG. 13B formed of audio data portion 200 and 0 data portions 202 and 204.

As can be seen from FIG. 6B, each row stored in memory 29 is read therefrom in response to the positive portion of the audio enable signal AWEN. The duration of this AWEN signal is equal to $k'_1$ bytes and, thus, only audio data bytes $D_0 \ldots D_{27}$, and none of the 0 bytes, are read from the memory. Since the 0 data portions 202 and 204 are not read, only the audio data portion 200 is read out. This digital audio data is band-expanded by expander 10B and then converted to analog form by D/A converter 11B.

It is appreciated that, in the embodiment described, the known, predetermined data that is added to the audio product code configuration so as to convert that configuration to one which is substantially identical to the video product code configuration consists of 0 data bytes. Such 0 data does not affect the error correction operation performed by error corrector 9A and, thus, simply serves to convert the audio product code configuration to the video product code configuration.

As an alternative, the known, predetermined data that is added to the audio product code configuration by adder 23 in the recording apparatus of FIG. 5 or by adder 28 in the reproducing apparatus of FIG. 7 need not be limited solely to the bytes of 0 data discussed above. Rather, the known, predetermined data may exhibit a particular pattern which has the effect of reducing the low frequency band or digital sum variation of the audio product code. Thus, plural bytes of a preset pattern may be added to each row and each column of the $k'_1 \times k'_2$ array of audio data bytes. As before, $k_1-k'_1$ bytes of the preset pattern may be added to each row of the audio product code configuration and $k_2-k'_2$ bytes of the preset pattern may be added to each column of the audio product code configuration. One example of apparatus for generating such known, predetermined data that reduces the low frequency component or DSV of the audio product code is illustrated in the block diagram of FIG. 8.

Here, when recording audio data, the output of memory 22 is coupled to a digital signal processor 30 which replaces the source of 0 data bytes in FIG. 5. The digital signal processor is adapted to evaluate the bit content of the audio data supplied thereto from memory 22 to generate a preset pattern which reduces the low frequency component and/or DSV of the audio product code. For example, digital signal processor 30 may be of the type that is capable of generating a predetermined number of bit patterns which serve to reduce the low frequency component and/or DSV of the audio product code. A particular one of those predetermined patterns is selected as a function of the bit content of the audio data supplied thereto, and this selected pattern is coupled to input 23b of adder 23. In addition, an identifying signal, known as a pattern ID signal, is generated by the signal processor and supplied to modulating circuit 5B (FIG. 5) for recording in, for example, the ID signal portion of the sync block shown in FIG. 3B. Adder 23 operates to add the selected pattern to the audio data that is coupled to parity circuit 4A in much the same manner as was described above in conjunction with FIG. 5. Here, the selected pattern is substituted for the 0 data bytes.

It is appreciated that, by using a selected pattern rather than 0 data bytes, the inner and outer parity codes that are added to the audio product code configuration are influenced by such pattern. However, since the added pattern is deleted from the converted audio product code configuration before the audio data is recorded, it is important that, for error correction purposes, the very same pattern be added to the reproduced audio data prior to error correction thereof. This return of the selected pattern to the reproduced audio data is carried out by the apparatus shown in FIG. 9, wherein pattern ID detecting circuit 31 is used in place of the source of 0 data bytes in FIG. 7.

Figure 9:
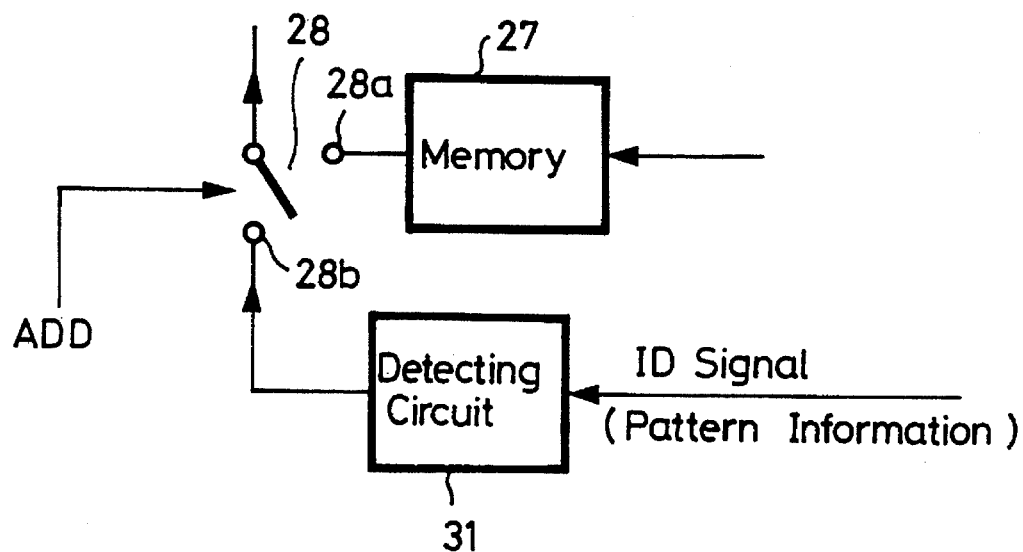
FIG. 9 is a block diagram of still another embodiment of the present invention.

Detecting circuit 31 is adapted to detect the pattern ID signal that had been recorded on and reproduced from the record medium. The detecting circuit further operates to generate the particular pattern that is identified by the pattern ID signal. As shown in FIG. 9, this selected pattern, which is identical to the pattern that was added by adder 23 to the audio data during a recording operation, now is added by adder 28 to the audio product code reproduced from the record medium and temporarily stored and read from memory 27. Hence, adder 28 uses the very same pattern that had been used during the recording operation, which minimizes the low frequency component and/or DSV of the audio data to convert the audio product code configuration and supply the converted product code to error corrector 9A. Accordingly, the inner and outer parity codes which were generated by parity circuit 4A as a function (at least in part) of the pattern that had been selected by digital signal processor 30 now can be used to correct errors that may be present in the reproduced audio data. It is appreciated that detecting circuit 31 generates an error-free version of this pattern, so that errors that may be detected by error corrector 9A will be errors in the audio data and not errors in the added pattern.

Figure 8:
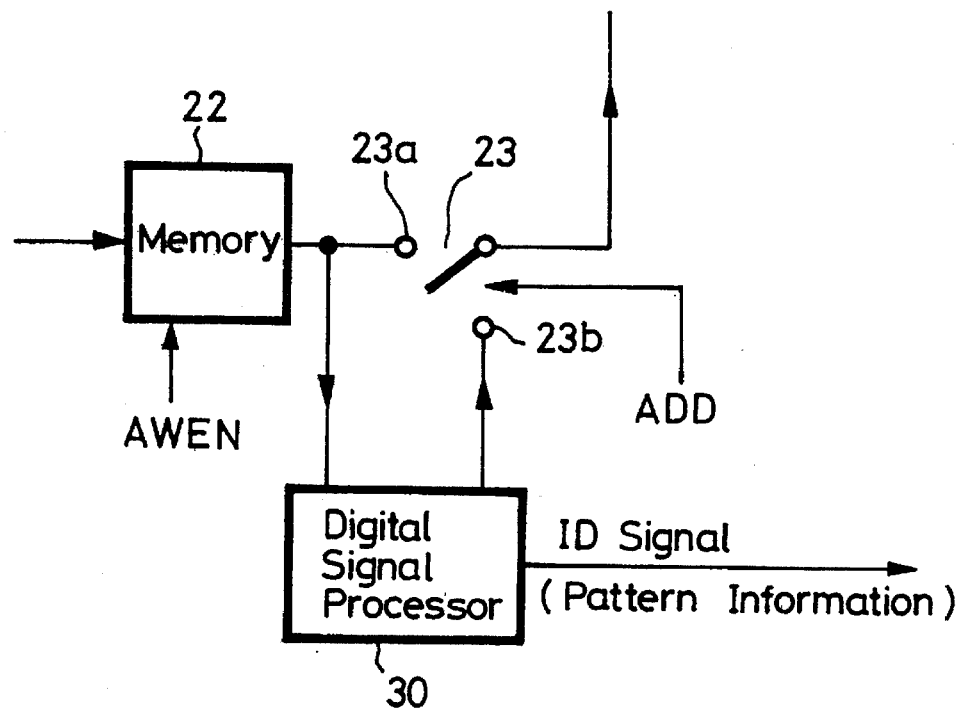
FIG. 8 is a block diagram illustrating another embodiment of the present invention.

In a preferred implementation of the embodiment shown in FIGS. 8 and 9, the pattern ID signal generated by digital signal processor 30 is recorded in, for example, the ID signal portion of the audio sync block shown in FIG. 3B. It will be appreciated that this pattern ID signal may be recorded at any other desired location in a segment, provided it is recoverable during a reproducing operation so that the pattern that had been used in the recording apparatus to permit the same error detection/correction coding circuit to operate on both video and audio data likewise can be used in the reproducing apparatus to permit the very same error correcting circuit to operate on both the video and audio data.

The principals of the present invention are applicable not only to the processing of video and audio data but also to other types of data. If such data is represented by, for example, product code configurations, then even if different product code configurations normally are used, the smaller product code configuration can be enlarged and, thus, converted so as to be substantially the same as the larger product code configuration, thereby permitting a common processing circuit to be used with both types of data. Thus, signal processing devices, such as error processing circuits, that operate on product codes of fixed size, can be used with data that initially are configured in product code configurations of different sizes.

Figure 10:
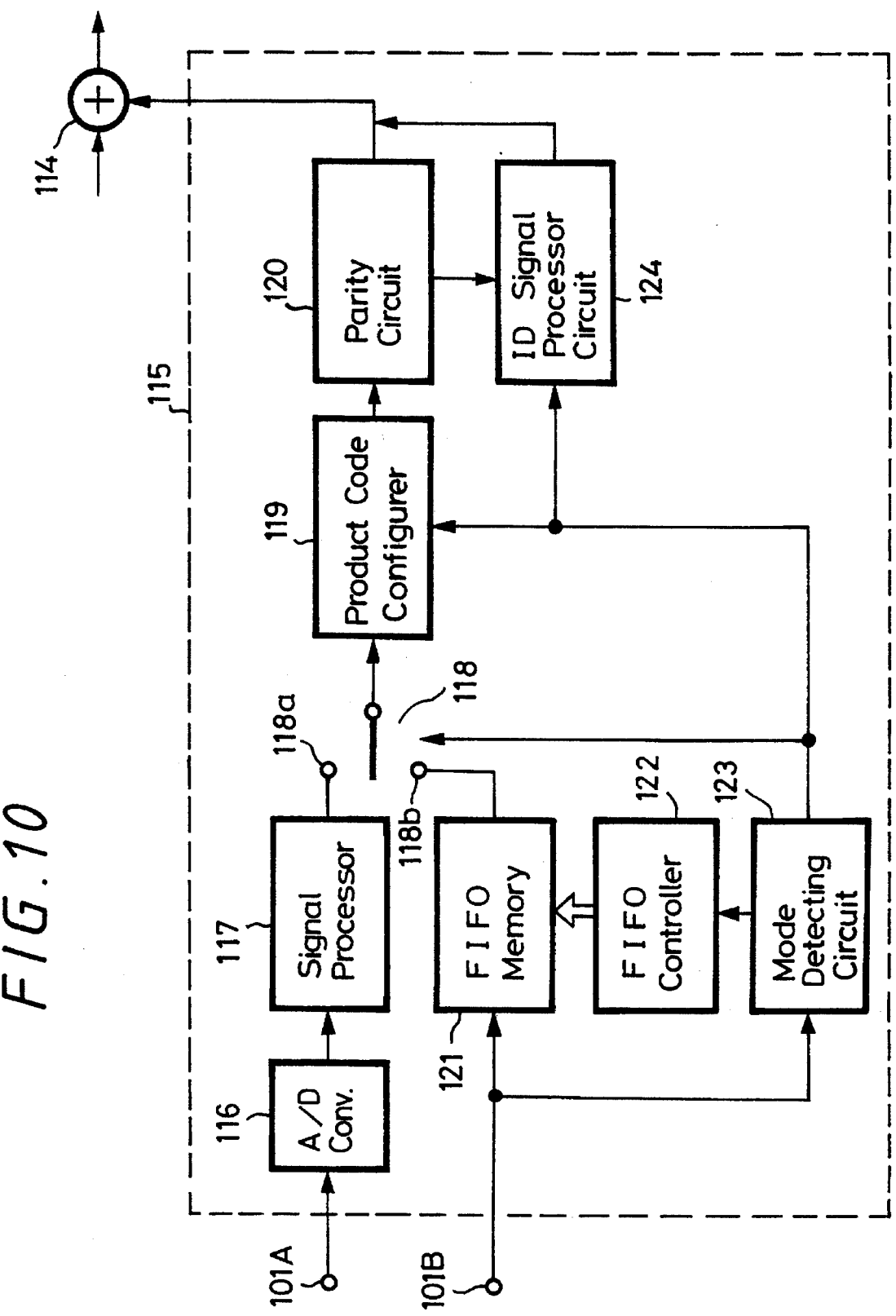
FIG. 10 is a block diagram of yet another embodiment representing the manner in which the present invention may be used to record digital audio signals of different bit rates.

The present invention also can be used to permit a common processing device to be used with data exhibiting different clock rates. For example, and as discussed above, a common audio processing device can be used to process digitized audio data from different sources, even if those sources exhibit different bit rates. An embodiment of the application of this invention to digitized audio data supplied from sources having different clock rates is illustrated in FIG. 10. One use of this embodiment is to record digital audio data that is supplied concurrently with video data, as when a studio camera is coupled to the DVTR, or to dub digital audio data that is supplied directly from an external source, such as a CD, and need not be converted to digital form. Such dubbing may be desired when the DVTR is used for special effects.

FIG. 10 illustrates an audio signal processor 115 comprised of an A/D converter 116, a signal processor 117, a product code encoder 119, a parity circuit 120, a first-in-first-out (FIFO) memory 121 and a mode detector 123. A/D converter 116 is coupled to an input terminal 101A and is adapted to receive an analog audio signal that is supplied at the same time as a video signal may be supplied to the DVTR. As an example, the analog audio data may be comprised of two channels, such as the left and right channels of a stereo signal. A/D converter 116 is adapted to convert the analog audio signal into digital audio data by sampling the analog audio signal at a sampling rate of, for example, 48 kHz, and by representing each sample as 16-bit data. Since two channels of audio signals are assumed to be supplied to input terminal 101A, A/D converter 116 generates digital audio data at the following bit rate:

48 kHz×16 bits×2 channels=1,536 Mb/sec.

The digitized audio data exhibiting the aforementioned bit rate is processed by signal processor 117, for example, to obtain data compression or other enhancements. To best understand the present invention as it applies to the embodiment of FIG. 10, let it be assumed that the digitized audio data is not subjected to data compression. Hence, this digitized audio data is coupled by way of a mode selector switch 118 to product code configurer 119. The mode selector switch is controlled by mode detector 123, as will be described. In the present example, it has been assumed that an analog audio signal is supplied to input terminal 101A and an analog input mode is selected so as to couple the digitized audio data produced by A/D converter 116 to product code encoder 119.

The product code configurer is adapted to encode successive bytes of audio data in the $k'_1 \times k'_2$ product code configuration of FIG. 3C. Accordingly, $k'_1$ columns and $k'_2$ rows of audio data bytes are stored in a memory included in product code configurer 119, resulting in the $k'_1 \times k'_2$ array of columns and rows. In the numerical example shown in FIG. 3C, the audio data is configurer in an array of 28×26=728 bytes.

The product code encoded by product code configurer 119 is supplied to parity circuit 120 which operates to add inner and outer parity codes thereto. For example, 8 parity bytes are added to each row of audio data bytes and 6 parity bytes are added to each column of audio data bytes. As a result, with the addition of the inner and outer parity codes, the product code configuration of the audio data is comprised of $n'_1 \times n'_2 = 36 \times 32 = 1152$ bytes. This parity encoded audio data is read out from parity circuit 120 to a mixer 114 whereat it is mixed with the video data (not shown) processed separately by a video channel. The mixed video and audio data are coupled to a magnetic recording interface for recording on a magnetic record medium.

Audio signal processor 115 also includes an input terminal 101B to which digital audio data is supplied directly, as from a CD. This may be useful in dubbing or other special effects recording operations. However, the bit rate of the digital audio data supplied to input terminal 101B may not be equal to the 1,536 Mb/sec. bit rate of A/D converter 116. As a result, parity circuit 120 may not be fully compatible with this different bit rate. FIFO memory 121 and product code configurer 119 function to convert this digital audio data having a different bit rate to a product code configuration with which parity circuit 120 is compatible. The FIFO memory is coupled to input terminal 101B and is adapted to write the supplied digital audio data thereinto at the same bit rate as that data and to read out such temporarily stored data at the compatible (or standardized) 1,536 Mb/sec. bit rate. Thus, FIFO memory 121 functions to convert the bit rate of the input digital audio data into the standard bit rate at which A/D converter 116 operates.

Mode detector 123 also is coupled to input terminal 101B and is adapted to detect a digital input mode identifying signal normally accompanying the digital audio data supplied to this input terminal. The mode identifying signal serves to identify the bit rate of the input digital audio data. Mode detector 123 is coupled to mode selector switch 118 and is responsive to the presence of a digital input mode signal to change over the mode selector switch so as to couple product code encoder 119 to FIFO memory 121. In the absence of a digital input mode signal, the product code encoder is coupled to signal processor 117. If desired, a manual analog/digital input mode signal may be supplied to mode detector 123 to perform the same function as the mode identifying signal normally accompanying the digital audio signal applied to input terminal 101B.

Mode detector 123 also is coupled to a FIFO controller 122 to supply the detected mode identifying signal thereto. The FIFO controller supplies write clock signals to FIFO memory 121 at a bit rate determined by the mode identifying signal detected by the mode detector.

As illustrated, product code configurer 119 is coupled to mode detector 123 to receive the detected mode identifying signal and to determine the difference between the amount of data supplied thereto in a given period of time (e.g. one second) at the standard bit rate and the amount of data supplied thereto in that same period of time at the bit rate identified by the mode identifying signal. Product code configurer 119 uses this determined data difference to calculate the amount of data that should be added to the input digital audio data in order to provide a product code configuration that is substantially identical to the product code configuration that is provided when an input analog audio signal is supplied to the audio processor. Thus, the product code encoder adds known, predetermined data to the product code configuration derived from the input digital audio data so as to convert that product code configuration to a standard product code configuration. Then, parity circuit 120 is readily operable on the product code configuration supplied thereto from product code configurer 119, regardless of whether the input audio signal is an analog audio signal or a digital audio signal supplied from an external source.

Product code configurer 119 is adapted to add known, predetermined data to the digital audio data supplied thereto from FIFO memory 121 by interleaving such known, predetermined data with the audio data bytes. For example, such known, predetermined data may be 0 data bytes which are interleaved with the audio data bytes. Parity circuit 120 is adapted to detect the locations of such 0 data bytes and is coupled to an ID signal processor 124 which functions to generate position location ID signals that serve to identify the interleaved locations of such 0 data bytes. The ID signal processor also is coupled to mode detector 123 to produce additional identifying data representing the bit rate of the digital audio data supplied to input terminal 101B as well as the fact that the encoded digital audio data had been supplied directly in digital form. The output of ID signal processor 124 is coupled with the output of parity circuit 120 to mixer 114, such that the parity-coded digital audio data together with the identifying data produced by the ID signal processor are recorded on the record medium.

The manner in which audio signal processor 115 operates to convert the product code configuration of digital audio data supplied directly to input terminal 101B now will be described. Let it be assumed that the digital audio data supplied to input terminal 101B had been sampled at the rate of 33 kHz per channel, that each sample consists of 16 bits and that the audio data represents 2 channels. Consequently, the bit rate of this digital audio data is:

32 *kHz*×16 *bits*×2 *channels*=1.024 *Mb/sec.*

Let it further be assumed, as mentioned above, that A/D converter 116 operates at a 48 kHz sampling rate, resulting in a bit rate of audio data derived from an input analog audio signal of:

48 *kHz*×16 *bits* 2 *channels*=1.536 *Mb/sec.*

Figure 11A:
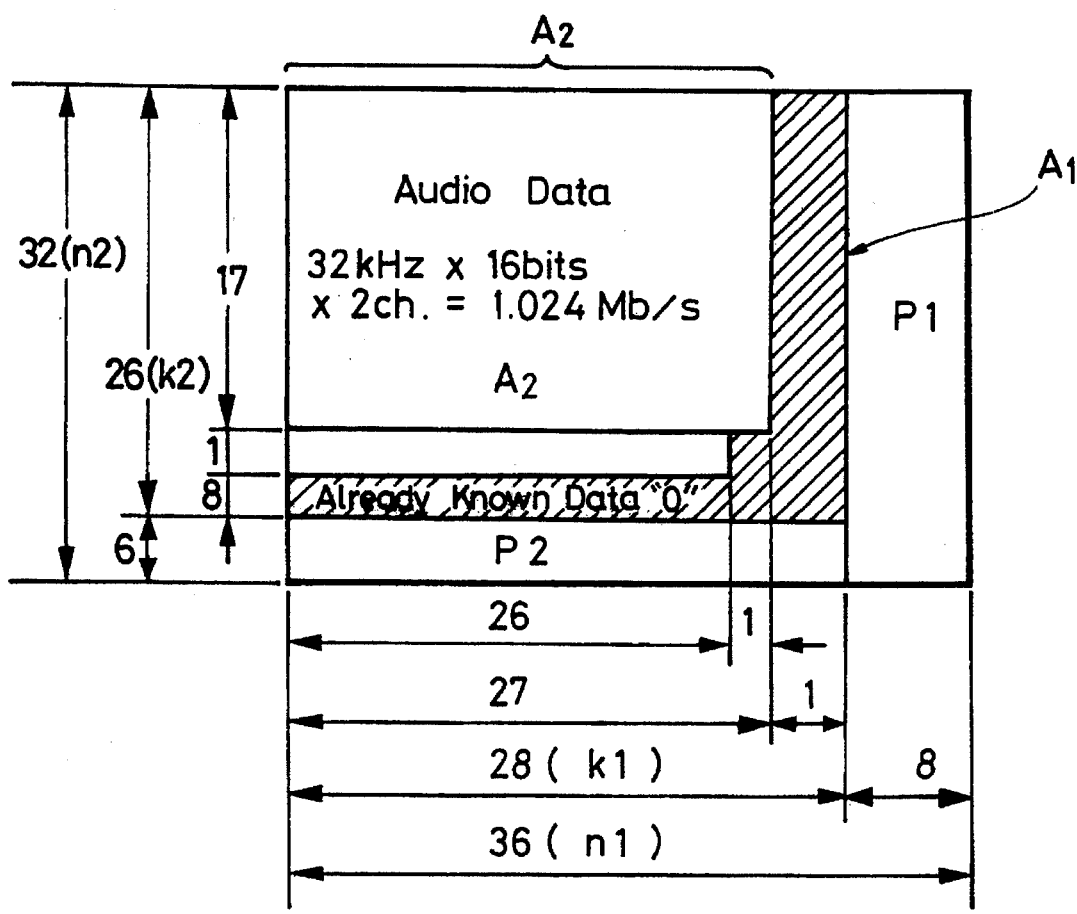
FIGS. 11A and 11B are useful in understanding the manner in which the embodiment shown in FIG. 10 operates.

When digital audio data at the 1.536 Mb/sec. bit rate is encoded in product code configuration, the result is a $k_1 \times k_2$ array of columns of rows, wherein $k_1 \times k_2 = 28 \times 26 = 728$ bytes, as shown in FIG. 3C and repeated in FIG. 11A. This product code configuration is referred to as the $A_1$ product code configuration.

When the digital audio data of 1.024 Mb/sec. bit rate is encoded in product code configuration, the resultant product code configuration $A_2$ contains a lesser amount of data bytes than product code configuration $A_1$. The ratio of the number of bytes included in product code configuration $A_2$ to the number of bytes includes in product code configuration $A_1$ is equal to the ratio of the bit rates of the respective digital signals. Thus, $$\frac{\text{Bytes in } A_2}{\text{Bytes in } A_1} = \frac{32 \times 16 \times 2}{48 \times 16 \times 2} = \frac{2}{3}$$

Thus, the number of bytes included in product code configuration $A_2$ is seen to be approximately 485. FIG. 11A illustrates a $k'_1 \times k'_2$ array of columns and rows of audio data bytes in product code configuration $A_2$. It is seen that, except for one byte, product code configuration $A_2$ is comprised of a 27×18 array of columns and rows. In FIG. 11A, the cross-hatched area represents the difference between the data included in product code configuration $A_1$ and the data included in product code configuration $A_2$. Product code 119 adds known, predetermined data to product code configuration $A_2$ so as to convert the product code configuration of $A_2$ to that of product code configuration $A_1$.

Now, when digital audio data of 32 kHz sampling rate is supplied to input terminal 101B, the mode identifying signal which accompanies that data is detected by mode detector 123 and supplied to FIFO controller 122, thus identifying this digital data as having a 32 kHz sampling rate and, thus, a 1,024 Mb/sec. bit rate. The FIFO controller supplies write clock signals to FIFO memory 121 to write this digital audio data thereinto at the 1,024 Mb/sec. bit rate. After being stored temporarily in the FIFO memory, the digital audio data is read out therefrom at a read clock rate determined by a 48 kHz sampling rate, or 48 kHz×16 bits×2 channels= 1.536 Mb/sec. This read out digital audio data is coupled to product code configurer 119 by mode selector switch 118 to be encoded in the product code configuration $A_2$, shown in FIG. 11A.

As mentioned above, the product code configurer determines the difference in the amount of data included in product code configuration $A_1$, which may be referred to as the standard product code produced when the digital audio data is sampled at the 48 kHz sampling rate, and the amount of data included in product code configuration $A_2$. In the numerical example described herein, this difference is 728 bytes– 485 bytes=243 bytes. This difference also is illustrated as the cross-hatched area in FIG. 11A; and product code configurer 119 adds known, predetermined data, such as 0 data bytes, to product code configuration $A_2$, thereby converting this product code configuration to the product code configuration of $A_1$. Hence, a common, or standard product code configuration is provided for the digital audio data supplied to input terminal 101B even though the bit rate of that digital audio data differs from the standard bit rate normally used to digitize analog audio signals supplied to input terminal 101A.

Figure 11B:
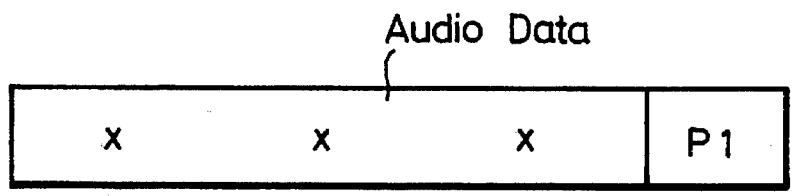

In the preferred embodiment, the known, predetermined data, such as the 0 data bytes, are not necessarily appended to the end of each row and to the end of each column in the 27×18 array of product code configuration $A_2$. Rather, such known, predetermined data is interleaved with the digital audio data. FIG. 11B schematically illustrates a typical row of digital audio data in product code configuration $A_2$, with the positions of the interleaved, known, predetermined data represented by X. This interleaved data preferably is comprised of bytes of 0 data, although other bit patterns may be used, such as those which serve to reduce the low frequency component or DSV of the digital audio data.

The converted product code configuration $A_2$ produced by product code configurer 119, having the known, predetermined data interleaved with the digital audio data, is supplied to parity circuit 120. The parity circuit detects the positions at which the known, predetermined data is interleaved and supplies to ID signal processor 124 position-representing data. This position data, which identifies the interleaved locations of the known, predetermined data in the converted product code configuration $A_2$, is incorporated into the ID data generated by the ID signal processor and added to the parity-coded digital audio data produced by parity circuit 120. The ID data generated by ID signal processor 124 also includes a signal representing the input digital audio data mode and another signal derived from the mode identifying signal supplied thereto by mode detector 123 which identifies the bit rate of the original digital audio signal supplied to input terminal 101B. The ID data is recorded in, for example, the ID signal portion of the audio data shown in FIG. 3B.

It is appreciated that if the bit rate of the digital audio signal supplied to input terminal 101B is equal to the standard bit rate of 48 kHz×16 bits×2 channels, product code configurer 119 need not add known, predetermined data to product code configuration $A_2$ because this product code configuration is of the same size as product code configuration $A_1$.

Figure 12:
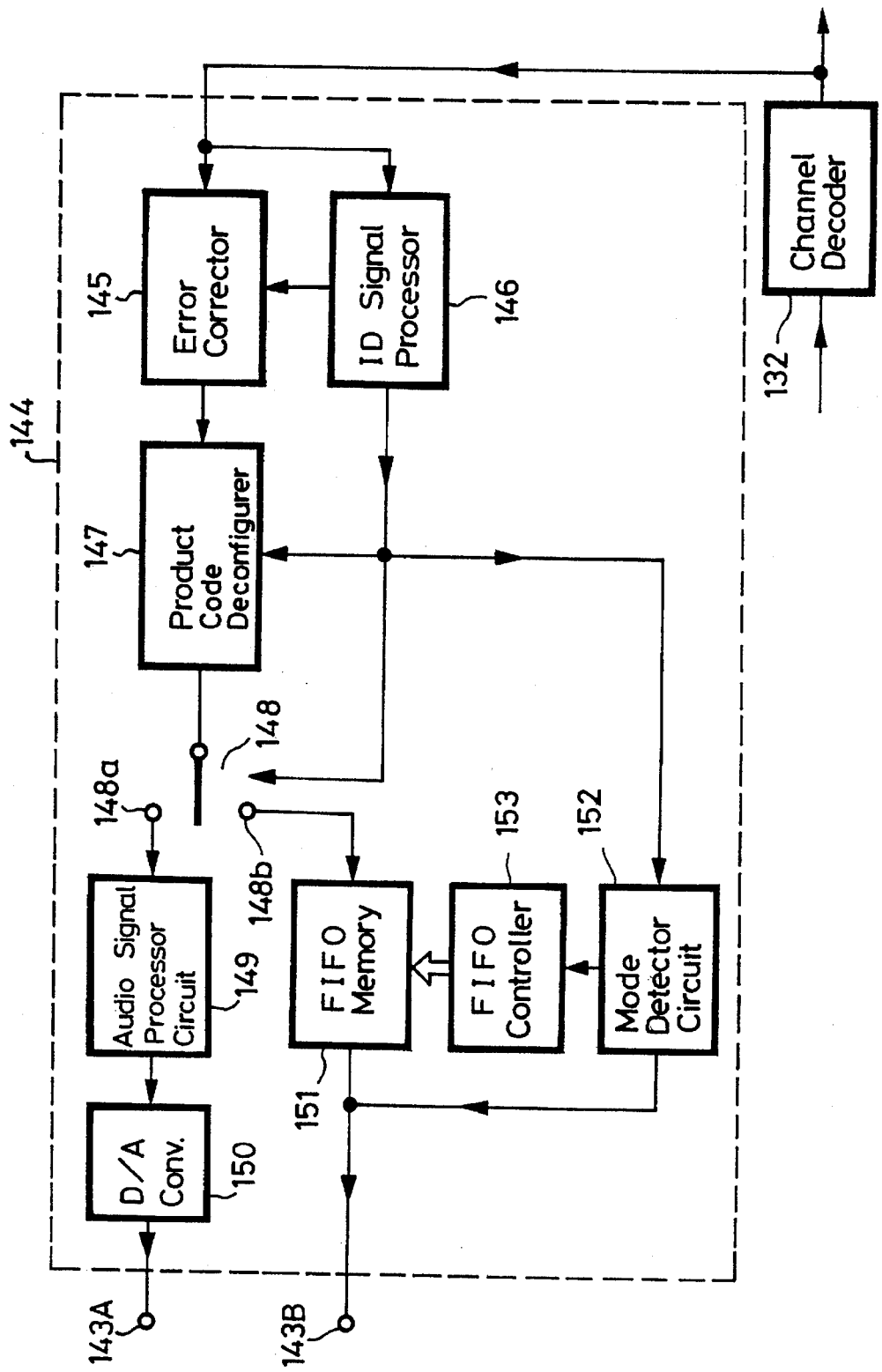
FIG. 12 is a block diagram of yet another embodiment of the present invention used to reproduce the digital signals recorded by the apparatus shown in FIG. 10.

FIG. 12 illustrates an audio signal processor 144 which is compatible with audio signal processor 115 and is adapted to recover audio data reproduced from a record medium to return that audio data either to analog form or to the digital form in which that data originally had been supplied for recording, depending upon the mode in which it was recorded. The audio signal processor includes a channel decoder 132, an error corrector 145, a product code deconfigurer 147, a D/A converter 150 and a FIFO memory 151. Channel decoder 132 is coupled to receive the reproduced digital audio data that had been encoded with parity data and that includes the identifying data generated by ID signal processor 124. This digital audio data and ID data are coupled to error corrector 145 and to ID signal processor 146.

The error corrector is adapted to perform an error correction operation on the product code configuration supplied thereto. If the product code configuration appears as product code configuration $A_1$ shown in FIG. 11A, containing inner and outer parity data, such parity data is used to detect and correct errors that may be present in the $k_1 \times k_2$ array of audio data bytes. The error correction operation is conventional and known to those of ordinary skill in the art. Hence, further details thereof are not necessary for an adequate understanding of the present invention.

ID signal processor 146 detects the reproduced identifying data and is coupled to error corrector 145 to supply to the error corrector the interleave position data that is recovered from the identifying data. It is recognized that, because of dropout or other errors, the known, predetermined data that had been interleaved with the audio data bytes, as depicted in FIG. 11B, may be subjected to bit errors. For example, if this interleaved data consists of 0 data bytes, errors may be introduced into those 0 data bytes. By supplying error corrector 145 with data representing the positions of this interleaved data, the error corrector is readily adapted to substitute "clean" data for the interleaved data, thus replacing possibly erroneous data with correct bits. The error corrector carries out its error correction operation on the product code in which the "clean" data has been substituted in the interleave positions.

Error corrector 145 is coupled to product code deconfigurer 147 which re-converts the converted product code configuration $A_2$ to its original product code configuration, as by deleting the known, predetermined data that had been added by product code configurer 119. Deconfigurer 147 also is coupled to ID signal processor 146 to receive the mode identifying signal and thereby determine whether a deletion operation should be carried out. It is appreciated that if the audio data that is supplied to audio signal processor 144 by channel decoder 132 is digital audio data that had been derived from analog audio data supplied to input terminal 101A, the deletion operation need not be carried out. Thus, if the mode identifying signal identifies the input analog audio mode, or a bit rate of 48 kHz×16 bits×2 channels, product code deconfigurer 147 does not delete data from the product code supplied thereto. However, if the mode identifying signal identifies any other bit rate, the product code deconfigurer deletes those known, predetermined data bytes that had been added to enlarge the product code configuration to the "standard" $k_1 \times k_2$ configuration. Product code deconfigurer 147 is adapted to delete the interleaved known, predetermined data from those interleave positions identified by the position identifying data included in the ID data supplied to ID signal processor 146.

The output of product code deconfigurer 147 is coupled by a mode selector switch 148 either to D/A converter 150 by way of audio signal processor circuit 149 or to FIFO memory 151. The mode selector switch includes a control input coupled to ID signal processor 146 and is controlled by the mode identifying signal that is detected by the ID signal processor. It is recognized that if the mode identifying signal identifies the input analog audio mode, the mode selector switch couples the product code deconfigurer to audio signal processor circuit 149. However, if the mode identifying data identifies the input digital audio mode, mode selector switch 148 couples product code deconfigurer 147 to FIFO memory 151.

FIFO memory 151 complements FIFO memory 121 of FIG. 10 by restoring the original bit rate to the digital audio data supplied thereto by product code deconfigurer 147. The FIFO memory is coupled to a FIFO controller 153 which supplies write and read clock signals to the memory. It will be recognized that the FIFO controller supplies write clock signals at the standard bit rate 48 kHz×16 bits×2 channels, and read clock signals at the bit rate identified by the mode identifying data. A mode detector 152 is coupled to ID signal processor 146 to detect this mode identifying data and supply an indication thereof to FIFO controller 153, from which the FIFO controller generates the appropriate read clock signals.

The output of FIFO memory 151 is coupled to output terminal 143B to supply digital audio data at the same bit rate as was supplied to input terminal 101B (FIG. 10) for recording. Mode detector 152 also is coupled to output terminal 143B to add the mode signal to the digital audio data, as is conventional.

In operation, channel decoder 132 supplies to error corrector 145 a product code of standard configuration, such as the configuration represented by product code configuration $A_1$ in FIG. 11A. Let it be assumed that this product code configuration $A_1$ has been derived from an input analog audio signal supplied to input terminal 101A of FIG. 10. Accordingly, the ID data which accompanies the product code identifies the input analog audio mode and the standard bit rate, and does not include interleave position identifying data. The error corrector carries out an error correction operation based upon the inner and outer parity codes that had been appended to the product code configuration, and product code deconfigurer 147 supplies audio bytes on a row-by-row basis to audio signal processor circuit 149 which, in turn, couples digital audio data to D/A converter 150 for conversion to analog form. It is appreciated that audio signal processor circuit 149 is compatible with signal processor 117 of FIG. 10, and if signal processor 117 operates to compress the digital audio data, audio signal processor circuit 149 operates to expand that audio data to its original form.

Let it be assumed that the mode ID data which is recovered with the product code identifies a non-standard bit rate, and further identifies the input digital audio mode. Consequently, mode selector switch 148 is changed over to couple product code deconfigurer 147 to FIFO memory 151.

It is recognized that digital audio data supplied to error corrector 145 by channel decoder 132 is arranged according to product code configuration $A_1$. Preferably, the error corrector includes a memory for storing the $n_1 \times n_2$ array of columns and rows which include product code configuration $A_1$. ID signal processor 146 supplies to error corrector 145 the interleave position data included in the recovered ID data, so that the error corrector substitutes "clean" 0 data bytes for the interleaved 0 data bytes, thus preventing any contamination in the error correcting operation that may be occasioned by errors in the interleaved 0 data bytes.

The error corrector then performs an error correction operation using the inner and outer error codes that had been appended by parity circuit 120 to the $k_1 \times k_2$ product code configuration. If these error codes comprise parity data, such parity data is used to detect and correct errors that may be present in the digital audio data. Other error correcting operations may be carried out consistent with the types of error codes that may be used, such as check codes, redundancy codes, and the like.

After error correction, error corrector 145 supplies to product code deconfigurer 147 the digital audio data contained in the $k_1 \times k_2$ array. The product code deconfigurer also is supplied with the interleave position signals detected by ID signal processor 146. Since the interleave positions of the known, predetermined data are identified, the product code deconfigurer readily deletes such data from the identified interleave positions, thereby reconverting the product code configuration from the standard configuration $A_1$ to the original configuration $A_2$, shown in FIG. 11A. It is appreciated that only useful digital audio information is included in product code configuration $A_2$. The interleaved data that had been added to expand the original product code configuration are deleted.

Product code $A_2$ is supplied from product code deconfigurer 147 to FIFO memory 151 by way of mode selector switch 148, for example, on a row-by-row basis. The data bytes includes in each row are written into the FIFO memory at the standard bit rate and then are read therefrom at the read clock rate determined by FIFO controller 153 which, as mentioned above, selects a read clock rate corresponding to the mode ID signal. Thus, if the original digital audio data that had been supplied to input terminal 101B for recording was of the 32 kHz×16 bits×2 channels bit rate, the mode identifying signal supplied to mode detector 152 identifies this bit rate; and FIFO controller 153 supplies a read clock signal to FIFO memory 151 at this original 32 kHz×16 bits× 2 channels bit rate. Thus, digital audio data of the original bit rate is supplied to output terminal 143B.

While the present invention has been particularly shown and described with reference to preferred embodiments, it will be readily appreciated by those of ordinary skill in the art that various changes and modifications may be made without departing from the spirit and scope of the invention. For example, error detection/correction need not be implemented solely by using parity data, as described herein. Other conventional error coding arrangements may be used. Also, the numerical examples of the sizes of the respective product code configurations are not intended to limit the present invention solely to such numerical examples. Still further, it will be appreciated that this invention is readily applicable to data that is encoded in various types of configurations and should not be limited solely to the encoding of data in the product code configuration illustrated herein. Nevertheless, the product code is preferred because it offers powerful error correcting capabilities.

It is intended that the appended claims be interpreted as covering the specific embodiments described herein, those modifications and alternatives which have been mentioned above, and all equivalents thereto.

What is claimed is:

1. Apparatus for processing first and second digital signals with the same processing device, said first and second digital signals having respective first and second data configurations which differ from each other, wherein said first data configuration contains a greater amount of data than said second data configuration, said apparatus comprising:

adder means for adding known, predetermined data to said second digital signal, thereby converting said second data configuration to said first data configuration, said known predetermined data comprising a digital pattern that is a function of the data content of said second digital signal for reducing a low frequency component of said second data configuration;

error processing means for processing digital signals in said first data configuration; and change over means coupled to said error processing means for selectively supplying said first digital signal or the converted second digital signal to said error processing means.

2. The apparatus of claim 1 wherein said first digital signal comprises digitized video data and said second digital signal comprises digitized audio data.

3. The apparatus of claim 1 wherein said generated digital pattern is a selected one of a plurality of patterns, and said digital signal processing means includes means for generating pattern ID data to identify the selected digital pattern and for adding said pattern ID data to the processed, converted second digital signal.

4. The apparatus of claim 1 wherein said second digital signal includes an ID field containing pattern ID data which identifies a selected one of a plurality of digital patterns; and said adder means comprises detecting means for detecting said pattern ID data to generate the identified digital pattern for reducing a low frequency component of said second data configuration, and means for appending the generated digital pattern to said second digital signal and thereby converting said second data configuration of said second digital signal to said first data configuration.

5. The apparatus of claim 1 wherein said first and second digital signals comprise digitized audio signals of different clock rates.

6. The apparatus of claim 1 further comprising deletion means coupled to said error processing means for deleting from the processed, converted second digital signal the known predetermined data that had been added thereto.

7. The apparatus of claim 6 wherein said deletion means comprises storage means for storing the processed, converted second digital signal, and read-out means for reading out from said storage means substantially all of the stored digital signal therein except said known predetermined data.

8. The apparatus of claim 1 wherein the digital signal supplied to said error processing means includes error detection/correction data; and said error processing means comprises error correcting means responsive to said error detection/correction data for detecting and correcting errors in the supplied digital signal.

9. The apparatus of claim 8 wherein said error detection/correction data is parity data.

10. The apparatus of claim 1 wherein said error processing means comprises error detection/correction generating means for generating error detection/correction data in response to the digital signal supplied thereto and for adding said error detection/correction data to said supplied digital signal.

11. The apparatus of claim 10 wherein said error detection/correction data is parity data.

12. The apparatus of claim 10 wherein said error detection/correction generating means comprises outer error coding means for generating outer parity bytes and inner error coding means for generating inner parity bytes.

13. The apparatus of claim 1 wherein said first and second data configurations are product code configurations respectively formed of a $k_1 \times k_2$ array of columns and rows of bytes and a $k'_1 \times k'_2$ array of columns and rows of bytes, wherein at least one of $k_1 > k'_1$ and $k_2 > k'_2$ is true.

14. The apparatus of claim 13 wherein said adder means includes means for adding said known, predetermined data to the second product code configuration so that after said adder means adds said known predetermined data to the second product code configuration. $k'_1$ becomes equal to $k_1$ and $k'_2$ becomes equal to $k_2$.

15. The apparatus of claim 14 wherein said known, predetermined data is formed of plural bytes of 0 data, and said means for adding is operative to add a first plurality of bytes of 0 data to each row of said second product code configuration and to add a second plurality of bytes of 0 data to each column of said second product code configuration, wherein said first plurality of bytes of 0 data is equal to the difference between $k_1$ and $k'_1$ prior to the addition of said known, predetermined data to said second product code configuration, and wherein said second plurality of bytes of 0 data is equal to the difference between $k_2$ and $k'_2$ prior to the addition of said known, predetermined data to said second product code configuration.

16. The apparatus of claim 14 wherein said known predetermined data is formed of plural bytes of a preset pattern, and said means for adding is operative to add a first plurality of bytes of said preset pattern to each row of said second product code configuration and to add a second plurality of bytes of said preset pattern to each column of said second product code configuration, wherein said first plurality of bytes of said preset pattern is equal to the difference between $k_1$ and $k'_1$ prior to the addition of said known, predetermined data to said second product code configuration, and wherein said second plurality of bytes of said preset pattern is equal to the difference between $k_2$ and $k'_2$ prior to the addition or said known predetermined data to said second product code configuration.

17. The apparatus of claim 14 wherein said means for adding includes interleave means for interleaving said known, predetermined data into said $k'_1 \times k'_2$ array of columns and rows of said second product code configuration.

18. The apparatus of claim 17 wherein said interleave means includes means for generating interleave ID data representing positions in said $k'_1 \times k'_2$ array in which said known, predetermined data is interleaved, and means for appending said interleave ID data to said converted second digital signal.

19. The apparatus of claim 18 wherein said means for appending comprises summing means coupled to said error processing means and said means for generating interleave ID data for adding to the processed, converted second digital signal said interleave ID data, thereby identifying the positions of said interleaved predetermined data.

20. Digital signal recording apparatus for recording first and second digital signals having respective first and second data configurations which differ from each other, said apparatus comprising:

adder means for adding known, predetermined data to said second digital signal to convert said second digital signal from said second data configuration to said first data configuration said known predetermined data comprising a digital pattern that is a function of the data content of said second digital signal for reducing a low frequency component of said second data configuration;

error detection/correction means responsive to digital signals supplied thereto for generating error code data and adding said error code data to the digital signals supplied thereto to provide error-coded digital signals;

supply means for supplying said first digital signal or the converted second digital signal to said error detection/correction means; and recording means for recording said error-coded digital signals.

21. The apparatus of claim 20 further comprising deletion means coupled to said error detection/correction means and responsive to said error-coded second digital signal for deleting said known, predetermined data therefrom, whereby the converted second digital signal is re-converted from said first data configuration to said second data configuration for recording.

22. The apparatus of claim 20 wherein said digital signal processing means includes pattern generating means for generating a selected one of plural digital patterns in response to the data of said second digital signal, pattern ID means for generating pattern ID data to identify the selected digital pattern, and means for recording said pattern ID data.

23. The apparatus of claim 20 wherein said error detection/correction means comprises parity means for adding parity data to the digital signals supplied thereto.

24. The apparatus of claim 20 wherein said first digital signals are digital video signals and said second digital signals are digital audio signals.

25. The apparatus of claim 20 wherein said first and second digital signals are digital audio signals of respectively different data bit rates.

26. The apparatus of claim 20 wherein said second digital signal has a bit rate less than that of said first digital signal; and said adder means comprises means for determining a difference in the quantity of data contained in said first and second digital signals in a given period of time, and means for adding to said second digital signal an amount of known, predetermined data substantially equal to said difference.

27. The apparatus of claim 26 wherein said means for adding comprises product code configuring means for encoding digital signals supplied thereto in product code configuration in a $k_1 \times k_2$ array of columns and rows, means for converting the bit rate of said second digital signal to that of said first digital signal, means for supplying the bit-rate converted second digital signal to said product code configuring means for encoding in product code configuration in a $k'_1 \times k'_2$ array of columns and rows, wherein $k_1 > k'_1$ and/or $k_2 > k'_2$, and means for adding $k_1 - k'_1$ bytes of known, predetermined data to respective rows of the product code configuration of the second digital signal and $k_2 - k'_2$ bytes of known, predetermined data to respective columns of the product code configuration of the second digital signal.

28. The apparatus of claim 20 wherein said first and second digital signals are in first and second product code configurations comprised of $k_1 \times k_2$ and $k'_1 \times k'_2$ arrays of data bytes, respectively, wherein $k_1 > k'_1$ and/or $k_2 > k'_2$, and wherein said adder means adds $k_1 - k'_1$ bytes of known predetermined data and $k_2 - k'_2$ bytes of known predetermined data to said second digital signal.

29. The apparatus of claim 28 wherein said known, predetermined data comprises 0 data bytes.

30. The apparatus of claim 28 wherein said error detection/correction means comprises parity means for adding inner and outer parity codes to digital signals supplied thereto in $k_1 \times k_2$ product code configuration.

31. The apparatus of claim 28 wherein said adder means includes interleave means for interleaving said bytes of known, predetermined data into said $k'_1 \times k'_2$ array of data bytes 32. The apparatus of claim 31 wherein said interleave means includes ID generating means for generating position ID data to identify the interleave positions in said $k'_1 \times k'_2$ array whereat said bytes of known, predetermined data are interleaved, and means for combining said position ID data with said error-coded digital signals.

33. Digital signal reproducing apparatus for reproducing first and second digital signals having first and second different data configurations, respectively, each of the digital signals including error code data added thereto for detecting and correcting errors therein, said apparatus comprising:

reproducing means for reproducing said first and second digital signals from a record medium;

adder means for adding known, predetermined data to said second digital signal to convert said second digital signal from said second data configuration to said first data configuration while retaining said error code data;

error correction means coupled to receive digital signals and responsive to said error code data to correct errors in the reproduced digital signal; and means for selectively supplying said first digital signal or the converted second digital signal to said error correction means.

34. The apparatus of claim 33 wherein said error code data comprises parity data and said error correction means comprises means responsive to said parity data for detecting and correcting errors in the digital signal supplied thereto.

35. The apparatus of claim 35 wherein said first digital signals are digital video signals and said second digital signals are digital audio signals.

36. The apparatus of claim 35 wherein said error correction means includes means for deleting said known, predetermined data from the error-corrected, converted second digital signal to return said second digital signal from said first data configuration to said second data configuration.

37. The apparatus of claim 36 wherein said means for deleting comprises storage means for storing the error-corrected, converted second digital signal, and read-out means for reading out from said storage means substantially all but said known, predetermined data stored therein.

38. The apparatus of claim 33 wherein said first and second digital signals are in product code configurations comprised of $k_1 \times k_2$ and $k'_1 \times k'_2$ arrays of data bytes respectively, wherein $k_1 > k'_1$ and/or $k_2 > k'_2$, and wherein said adder means adds $k_1 - k'_1$ bytes of known, predetermined data and $k_2 - k'_2$ bytes of known, predetermined data to said second digital signal.

39. The apparatus of claim 38 wherein said known, predetermined data comprises 0 data bytes.

40. The apparatus of claim 38 wherein said known, predetermined data comprises a digital pattern for reducing a low frequency component of said second data configuration.

41. The apparatus of claim 40 wherein the second digital signal reproduced from said record medium includes pattern ID data for identifying different ones of plural, preset digital patterns; and said adder means includes pattern generating means coupled to receive said pattern ID data and responsive thereto for generating the one preset digital pattern that is identified by said pattern ID data.

42. Digital signal reproducing apparatus for reproducing first and second digital signals recorded on a record medium and having the same data configuration, said first and second digital signals being derived from original data signals having different bit rates, each of the digital signals being recorded with error code data for error correction when reproduced, said second digital signal having known, predetermined data interleaved therein, said apparatus comprising:

reproducing means for reproducing said first and second digital signals from said record medium;

error correcting means coupled to said reproducing means and responsive to said error code data for correcting errors in the first or second digital signals;

converting means for converting said error-corrected second digital signal from said same data configuration to a second, different data configuration by deleting the interleaved known, predetermined data;

rate changing means coupled to said converting means for restoring the original bit rate to the converted, error-corrected second digital signal;

digital-to-analog converting means for converting the error-corrected first digital signal to analog form; and means for selectively supplying the converted second digital signal to said rate changing means or the error-corrected digital signal to said digital-to-analog converting means.

43. The apparatus of claim 42 wherein said first and second digital signals are digital audio signals.

44. The apparatus of claim 42, wherein said second digital signals include ID data recorded therewith representing said original bit rate and selectively enabling said converting means; and further including ID detecting means for detecting said ID data and supplying said ID data to said converting means.

45. The apparatus of claim 44 wherein said rate changing means comprises memory means for temporarily storing said converted, second digital signal, write clock means for generating write clock signals at a bit rate substantially equal to the bit rate of said first digital signal for writing said converted, second digital signal into said memory means, and read clock means responsive to said ID data for generating read clock signals at the original bit rate of said second digital signal for reading out said converted, second digital signal.

46. The apparatus of claim 44 wherein said ID data further includes interleave position data identifying positions in said second digital signal at which said known, predetermined data is interleaved, and said converting means is responsive to said interleave position data for deleting said known, predetermined data from said identified positions.

47. The apparatus of claim 46 wherein said ID detecting means is coupled to said error correcting means, and said error correcting means includes means responsive to said interleave position data for replacing said known, predetermined data with a "clean" version thereof.

48. The apparatus of claim 47 wherein said same data configuration comprises a $k_1 \times k_2$ product code configuration; and said converting means is operative to convert said $k_1 \times k_2$ product code configuration to a data configuration of less data at a bit rate substantially equal to the bit rate of said first digital signal and supply same to said rate changing means as said converted, second digital signal.

49. Apparatus for processing first and second digital signals with the same processing device, said first and second digital signals having respective first and second data configurations which differ from each other, wherein said first data configuration contains a greater amount of data than said second data configuration and said processing device is capable of processing digital signals having only said first data configuration, said apparatus comprising:

adder means for adding known, predetermined data to said second digital signal, thereby converting said second data configuration to said first data configuration;

error processing means for processing digital signals in said first data configuration only;

change over means coupled to said error processing means for supplying said first digital signal to said error processing means and for changing over to supply the converted second digital signal to said error processing means when said second digital signal is present, whereby the data content of said first and second digital signals are processed by said error processing means; and deletion means coupled to said error processing means for deleting from the processed, converter second digital signal the known predetermined data that had been added thereto, wherein said deletion means comprises storage means for storing the processed, converted second digital signal, and read-out means for reading out from said storage means substantially all of the stored digital signal therein except said known predetermined data.

50. The apparatus of claim 49 wherein said first digital signal comprises digitized video data and said second digital signal comprises digitized audio data.

51. The apparatus of claim 49 wherein said second digital signal includes an ID field containing pattern ID data which identifies a selected one of a plurality of digital patterns; and said adder means comprises detecting means for detecting said pattern ID data to generate the identified digital pattern for reducing a low frequency component for said second data configuration, and means for appending the generated digital pattern to said second digital signal, thereby converting said second data configuration of said second digital signal to said first data configuration.

52. The apparatus of claim 49 wherein said first and second digital signals comprise digitized audio signals of different clock rates.

53. The apparatus of claim 49 wherein said adder means comprises digital signal processing means coupled to receive said second digital signal and to generate a digital pattern as a function of the data content of said second digital signal for reducing a lower frequency component of said second data configuration, and means for appending the generated digital pattern to said second digital signal to convert said second data configuration.

54. The apparatus of claim 53 wherein said generated digital pattern is a selected one of a plurality of patterns, and said digital signal processing means includes means for generating pattern ID data to identify the selected digital pattern and for adding said pattern ID data to the processed, converted second digital signal.

55. The apparatus of claim 49 wherein the digital signal supplied to said error processing means includes error detection/correction data; and said error processing means comprises error correcting means responsive to said error detection/correction data for detecting and correcting errors in the supplied digital signal.

56. The apparatus of claim 55 wherein said error detection/correction data is parity data.

57. The apparatus of claim 49 wherein said error processing means comprises error detection/correction generating means for generating error detection/correction data in response to the digital signal supplied thereto and for adding said error detection/correction data to said supplied digital signal.

58. The apparatus of claim 57 wherein said error detection/correction data is parity data.

59. The apparatus of claim 57 wherein said error detection/correction generating means comprises outer error coding means for generating outer parity bytes and inner error coding means for generating inner parity bytes.

60. The apparatus of claim 49 wherein said first and second data configurations are product code configurations respectively formed of a $k_1 \times k_2$ array of columns and rows of bytes and a $k'_1 \times k'_2$ array of columns and rows of bytes, wherein at least one of $k_1 > k'_1$ and $k_2 > k'_2$ is true.

61. The apparatus of claim 60 wherein said adder means includes means for adding said known predetermined data to the second product code configuration so that after said adder means adds said known, predetermined data to the second product code configuration $k'_1$ becomes equal to $k_1$ and $k'_2$ becomes equal to $k_2$.

62. The apparatus of claim 61 wherein said known, predetermined data is formed of plural bytes of 0 data, and said means for adding is operative to add a first plurality of bytes of 0 data to each row of said second product code configuration and to add a second plurality of bytes of 0 data to each column of said second product code configuration, wherein said first plurality of bytes of 0 data is equal to the difference between $k_1$ and $k'_1$ prior to the addition of said known predetermined data to said second product code configuration, and wherein said second plurality of bytes of 0 data is equal to the difference between $k_2$ and $k'_2$ prior to the addition of said known, predetermined data to said second product code configuration.

63. The apparatus of claim 61 wherein said known, predetermined data is formed of plural bytes of a preset pattern, and said means for adding is operative to add a first plurality of bytes of said preset pattern to each row of said second product code configuration and to add a second plurality of bytes of said preset pattern to each column of said second product code configuration, wherein said first plurality of bytes of said preset pattern is equal to the difference between $k_1$ and $k'_1$ prior to the addition of said known, predetermined data to said second product code configuration, and wherein said second plurality of bytes of said preset pattern is equal to the difference between $k_2$ and $k'_2$ prior to the addition of said known, predetermined data to said second product code configuration.

64. The apparatus of claim 61 wherein said means for adding includes interleave means for interleaving said known, predetermined data into said $k'_1 \times k'_2$ array of columns and rows of said second product code configuration.

65. The apparatus of claim 64 wherein said interleave means includes means for generating interleave ID data representing positions in said $k'_1 \times k'_2$ array in which said known predetermined data is interleaved, and means for appending said interleave ID data to said converted second digital signal.

66. The apparatus of claim 65 wherein said means for appending comprises summing means coupled to said error processing means and said means for generating interleave ID data for adding to the processed, converted second digital signal said interleave ID data, thereby identifying the positions of said interleaved predetermined data.

* * * * *